(12) United States Patent
Hopkins

(10) Patent No.: US 11,844,337 B2
(45) Date of Patent: Dec. 19, 2023

(54) APPARATUS FOR SORTING MARINE SPECIES IN FISH TRAWL

(71) Applicant: United States of America, as represented by the Secretary of Commerce, Silver Spring, MD (US)

(72) Inventor: Nicholas Hopkins, Gautier, MS (US)

(73) Assignee: UNITED STATES OF AMERICA, AS REPRESENTED BY THE SECRETARY OF COMMERCE, Silver Spring, MD (US)

( * ) Notice: Subject to any disclaimer, the term of this patent is extended or adjusted under 35 U.S.C. 154(b) by 532 days.

(21) Appl. No.: 17/192,321

(22) Filed: Mar. 4, 2021

(65) Prior Publication Data
US 2021/0185992 A1 Jun. 24, 2021

Related U.S. Application Data

(63) Continuation-in-part of application No. 16/007,640, filed on Jun. 13, 2018, now Pat. No. 10,966,415.

(60) Provisional application No. 62/518,658, filed on Jun. 13, 2017.

(51) Int. Cl.
  *A01K 73/04* (2006.01)
  *A01K 75/04* (2006.01)

(52) U.S. Cl.
  CPC ............. *A01K 73/04* (2013.01); *A01K 75/04* (2013.01)

(58) Field of Classification Search
  CPC ........ A01K 73/00; A01K 73/02; A01K 74/00; A01K 75/00; B63B 35/16
  See application file for complete search history.

(56) References Cited

U.S. PATENT DOCUMENTS

| | | | | |
|---|---|---|---|---|
| 1,548,413 A * | 8/1925 | De Voogt | ............... | A01K 73/02 43/9.1 |
| 1,745,251 A * | 1/1930 | Enright | .................. | A01K 74/00 43/6.5 |
| 3,015,903 A * | 1/1962 | Willingham | ........... | A01K 80/00 43/9.7 |
| 3,132,434 A * | 5/1964 | Luketa | .................... | A01K 73/02 43/9.3 |
| 4,402,154 A * | 9/1983 | Pence | .................. | A01K 73/063 43/9.2 |
| 4,739,574 A * | 4/1988 | Saunders | ............... | A01K 73/02 43/9.2 |
| 4,805,335 A * | 2/1989 | West | .................... | A01K 73/063 43/9.2 |
| 4,869,010 A * | 9/1989 | Saunders, Sr. | ......... | A01K 73/02 43/9.2 |

(Continued)

*Primary Examiner* — Peter M Poon
*Assistant Examiner* — Marisa V Conlon

(57) ABSTRACT

Embodiments of the present invention relate to methods and apparatus for sorting undesired marine species during trawling, provides a pliable grid when the trawl net is pulled from the water and wound tightly on the net reel, and when the trawl is deployed in the water, the apparatus is fixed into place inside the trawl and holding its shape with consistent grid spacing. Marine species sorting apparatus in accordance with embodiments of the present invention includes grid, back straps, and lead ring. Grid includes a plurality of bars surrounded by grid frame. Grid frame is attached to lead ring at an angle using terminal couplers. Lead ring supports grid and secures marine species sorting apparatus in trawl webbing referred to as the extension.

20 Claims, 19 Drawing Sheets

(56) References Cited

U.S. PATENT DOCUMENTS

| | | | | | |
|---|---|---|---|---|---|
| 5,076,000 | A | * | 12/1991 | Anthony | A01K 75/00 |
| | | | | | 43/9.2 |
| 5,222,318 | A | * | 6/1993 | Stokes, Jr. | A01K 75/00 |
| | | | | | 43/9.2 |
| 5,287,645 | A | * | 2/1994 | Gois | A01K 73/12 |
| | | | | | 24/579.11 |
| 5,325,619 | A | * | 7/1994 | Paul | A01K 73/063 |
| | | | | | 43/9.2 |
| 5,575,102 | A | * | 11/1996 | Coulon | A01K 80/00 |
| | | | | | 43/104 |
| 6,223,462 | B1 | * | 5/2001 | Johannesson | A01K 73/02 |
| | | | | | 43/9.2 |
| 6,343,433 | B1 | * | 2/2002 | Granberg | A01K 79/00 |
| | | | | | 43/6.5 |
| 8,191,305 | B2 | * | 6/2012 | Gallagher | A01K 75/00 |
| | | | | | 43/9.95 |
| 9,877,466 | B2 | * | 1/2018 | Rommelaere | A01K 75/00 |
| 9,961,887 | B2 | * | 5/2018 | Ma | A01K 75/00 |
| 2005/0160656 | A1 | * | 7/2005 | Safwat | D07B 5/005 |
| | | | | | 43/9.95 |

\* cited by examiner

TERMINAL COUPLERS

APPARATUS FOR SORTING MARINE SPECIES IN FISH TRAWL

CROSS-REFERENCE TO RELATED APPLICATION

This application is a continuation-in-part of, and claims the benefit of priority from, U.S. patent application Ser. No. 16/007,640 filed on Jun. 13, 2018, entitled "Apparatus for Sorting Marine Species in Fish Trawl," which claims the benefit of priority from U.S. Provisional Patent Application Ser. No. 62/518,658, filed on Jun. 13, 2017, the contents of which are incorporated herein by reference.

STATEMENT REGARDING FEDERAL RIGHTS

The invention described herein was made with support from the National Oceanic and Atmospheric Administration (NOAA) of the United States Department of Commerce. The United States Government has certain rights in the invention.

FIELD OF THE INVENTION

The present disclosure relates generally to a fishing trawl device for selectively excluding undesired marine species from target species while harvesting.

BACKGROUND OF THE INVENTION

A function of a fish or shrimp trawl is to filter the sea life and benthic organisms from the water but, by design, a trawl can be indiscriminate. Environmental concerns have driven efforts to protect many marine species in a trawl's pathway. Many trawl fisheries have been incorporating devices such as sorting grids to exclude bycatch (protected or unmarketable composition of the catch) such as sea turtles, sharks, rays, seals, sturgeon, marine mammals, etc. The diminished weight and labor involved in handling the unwanted bycatch reduces fuel consumption, minimizes wear and tear on the gear, and lowers the cost of labor. Typically, a rigid sorting grid is sewn inside of a trawl where the catch is collected and enables removal of bycatch without any significant loss of the target species.

An example of a rigid sorting grid incorporated into a trawl is the Turtle Excluder Device (TED), which allows a protected sea turtle caught in shrimp trawl equipped with a TED to escape. TED grids physically direct bycatch larger than the bar spacing towards an opening in the webbing. Large sharks and sea turtles are separated and removed from the catch as the shrimp are collected in the cod end.

Rigid metal sorting grids are effective in shrimp trawls, but transferring that technology to a fish trawl is challenging. Fish trawls are often longer and heavier than shrimp trawls, which lead to the application of net reels to retrieve and deploy fish trawls. Winding a trawl onto a net reel creates torsion in the cables and webbing that can crush rigid grids when they are placed under each successive wrap of webbing and lines. Large scale fish trawls are made to be strong and pliable. Under extreme commercial fishing conditions, heavy loads and unpredictable sea conditions constantly test the integrity of the gear. A trawl built to hold 10,000 lbs. of catch should be expected to endure a magnitude of that weight when the catch is pulled through the water at high speeds, bounced across the sea floor, winched in by a boat in pitching seas (especially when the gear is at the surface), and finally lifted and discharged on deck. It is most likely the gear will begin to fail and fall apart at the point where an unyielding inflexible structure such as a rigid grid is sewn into the webbing of the trawl. Webbing distributes the stress of a heavy load over many knots and bars making meshes that can flex open and closed, absorbing stress and shock. When webbing is seized to a rigid frame this property is limited or lost and the ability of the trawl to withstand challenging conditions is compromised. A rigid structure sewn into a trawl will cause additional stress to the webbing under a heavy load and will diminish the overall loading capacity of the trawl.

A rigid grid is limited in how it can bend around a net reel and could break when the net reel applies excessive stress to the rigid grid. Another disadvantage of a rigid flat grid device in a fish trawl is the manner in which it filters the catch. The grid is sewn at an angle in the extension at the tail of the trawl, and is pitched towards an opening that allows turtles to escape from the trawl. A slow steady stream of fish has time to filter between the bars of the grid, but the trawl efficiency decreases when the rigid grid encounters a high volume of fish all at once. The webbing in front of the grid, especially around the opening, is unrestricted. When a large volume of fish is packed into the trawl the grid acts as a bottle neck that chokes down the webbing right behind the opening. As the limited amount of catch passes through the grid, or when the grid is overwhelmed and clogged, the mass in front of the grid quickly increases and expands in the webbing in front of the grid. The opening at the posterior end of the grid acts as a pressure relief for the built-up volume of fish packed ahead of the grid. When this occurs, a limited amount of fish will have time to pass through to the cod end of trawl net before the rest are discharged out of the opening.

Accordingly, there is a need for a trawl sorting grid device that provides a pliable grid when the net is pulled from the water and wound tightly on the net reel, and when the trawl is deployed in the water, the device is fixed into place inside the trawl and holds its shape with consistent grid spacing. There is also a need for a trawl sorting grid device that is strong enough to endure the repetitive, high volume and heavy loads of a commercial application while withstanding the punishing weather and sea conditions.

SUMMARY OF THE INVENTION

Embodiments of the present invention relate to methods and apparatus for sorting undesired marine species during trawling that provides a pliable grid when the trawl net is pulled from the water and wound tightly on the net reel, and when the trawl is deployed in the water, the apparatus is fixed into place inside the trawl and holding its shape with consistent grid spacing.

Accordingly, embodiments of the present invention relate to an apparatus for excluding undesired marine species from a trawl net during trawling, including a plurality of bars arranged in a symmetrical layout extending along a direction substantially traversing longitudinal axis of the trawl net, wherein the plurality of bars are separated by at least one predetermined bar spacing, wherein each of the plurality of bars has a predetermined length, wherein the plurality of bars have a predetermined stiffness; a grid frame surrounding the plurality of bars to form an opening at posterior end of the apparatus, wherein distal ends of at least two of the plurality of bars positioned distally from at least one of the plurality of bars positioned at the center of the grid frame is secured to the grid frame, wherein the opening formed at the posterior end of the apparatus allows for the undesired marine species to exit the trawl net; a plurality of back straps secured to at least one of the plurality of bars at a predetermined location, wherein each of the plurality of back straps is positioned perpendicular to the plurality of bars, wherein the plurality of back straps are positioned below the grid frame, wherein the plurality of back straps are separated by at least one predetermined distance; a grid frame extension secured to the grid frame to extend the posterior end of the apparatus above the opening, wherein the grid frame extension forms a curvature to receive flap netting positioned to seal the opening, wherein distal ends of the plurality of bars positioned proximally at center of the apparatus is secured to the grid frame extension, wherein the center bar is secured to the grid frame extension at apex of the curvature formed by the grid frame extension; a lead ring secured to ends of each of the plurality of back straps and proximal end of at least one of the plurality of bars, wherein the lead ring offsets the plurality of back straps and hold the plurality of bars at a predetermined angle, wherein the lead ring funnels marine species entering the trawl towards the plurality of bars; and a plurality of terminal couplers for securing the ends of each of the plurality of back straps and the proximal end of at least one of the plurality of bars to the lead ring, wherein the plurality of terminal couplers are oriented in a direction substantially facing the posterior end of the apparatus, wherein said apparatus is adapted for insertion within the trawl body before cod end of the trawl net, wherein lead ring is secured to fishing circle in the trawl net along a row of meshes perpendicular to the longitudinal axis of the trawl net, and wherein the back straps are secured to extension webbing in the trawl net. More particularly, each of the plurality of bars is a 1×19 stainless steel cable, and wherein each of the plurality of back straps is a 6×19 stainless steel cable. In one embodiment of the present invention, the plurality of back straps is secured to at least one of the plurality of bars with tuck splicing.

In some embodiments of the present invention, the lead ring is secured to proximal end of at least one of the plurality of bars. More particularly, the lead ring is a round hoop or a semi-circular hoop. In other embodiments of the present invention, the lead ring further includes a first lead ring secured to first ends of the plurality of back straps; and a second lead ring secured to second ends of the plurality of back straps, wherein the lead ring is open at top and bottom of the apparatus. More particularly, the proximal end of the plurality of bars are secured to at least one of the plurality of back straps secured to the first and second lead rings.

In one aspect of the present invention, the bar spacing separating the plurality of bars positioned proximal to the center of the grid frame is narrower than the bar spacing separating the plurality of bars positioned distally from the center of the grid frame.

In another aspect of the present invention, the at least one of the plurality of back straps positioned distally from the grid frame is shorter than the at least one of the plurality of back straps positioned proximal to the grid frame.

Some embodiments of the present invention further include a plurality of floats secured to predetermined locations on the plurality of bars, wherein the plurality of floats provide buoyancy to the apparatus.

In one embodiment of the present invention, the distance separating the ends of plurality of back straps is shorter than the distance separating the plurality of back straps proximal to the at least one of the plurality of bars positioned at the center of the grid frame.

Another embodiment of the present invention relates to an apparatus for excluding undesired marine species from a trawl net during trawling, including a grid comprising an array of plurality of bars and a plurality of back straps, wherein each of the plurality of bars is secured to at least one of the plurality of back straps at a predetermined location, wherein the plurality of bars are arranged vertically in a symmetrical layout on either side of a center bar, wherein the plurality of bars are spaced apart by at least one predetermined distance, wherein each of the plurality of bars has a predetermined length, wherein each of the plurality of back straps is positioned perpendicular to the plurality of bars; a grid frame surrounding the plurality of bars to form an opening at posterior end of the apparatus, wherein distal ends of at least two of the plurality of bars positioned distally from the center bar is secured to the grid frame, wherein the at least one of the plurality of back straps positioned distally from the grid frame is shorter than the at least one of the plurality of back straps positioned proximal to the grid frame, wherein the distance separating the ends of plurality of back straps is shorter than the distance separating the plurality of back straps proximal to the at least one of the plurality of bars positioned at the center of the grid frame, wherein the opening formed at the posterior end of the apparatus allows for the undesired marine species to exit the trawl net; a grid frame extension secured to the grid frame to extend the posterior end of the apparatus above the opening, wherein the grid frame extension forms a curvature to receive flap netting positioned to seal the opening, wherein distal ends of the plurality of bars positioned proximally at center of the apparatus is secured to the grid frame extension, wherein the center bar is secured to the grid frame extension at apex of the curvature formed by the grid frame extension; a lead ring for funneling marine species entering the trawl towards the plurality of bars, wherein ends of each of the plurality of back straps and proximal end of at least one of the plurality of bars are secured to the lead ring, wherein the lead ring offsets the plurality of back straps and hold the plurality of bars at a predetermined angle, wherein the lead ring is secured to fishing circle along a straight row of meshes perpendicular to a direction the trawl net is pulled; a plurality of terminal couplers for securing the ends of each of the plurality of back straps and the proximal end of at least one of the plurality of bars to the lead ring, wherein the plurality of terminal couplers are oriented in a direction substantially facing the posterior end of the apparatus; and a plurality of floats secured to predetermined locations on the plurality of bars, wherein the plurality of floats provide buoyancy to the apparatus, wherein said apparatus is adapted for insertion within the trawl body before cod end of the trawl net, wherein lead ring is secured to fishing circle in the trawl net along a row of meshes perpendicular to the longitudinal axis of the trawl net, and wherein the back straps are secured to extension panel in the trawl net. More particularly, each of the plurality of bars is a 1×19 stainless steel cable, and wherein each of the plurality of back straps is a 6×19 stainless steel cable. In one aspect of the present invention, the lead ring is a round hoop.

In one embodiment of the present invention, bar spacing separating the plurality of bars positioned proximal to the center of the grid frame is narrower than the bar spacing separating the plurality of bars positioned distally from the center of the grid frame.

Some embodiments of the present invention relate to an apparatus for excluding undesired marine species from a trawl net during trawling, including a grid comprising an array of plurality of bars and a plurality of back straps, wherein each of the plurality of bars is secured to at least one of the plurality of back straps at a predetermined location, wherein the plurality of bars are arranged vertically in a symmetrical layout on either side of a center bar, wherein the plurality of bars are spaced apart by at least a first predetermined distance, wherein each of the plurality of back straps is positioned perpendicular to the plurality of bars, wherein the plurality of back straps are spaced apart by at least a second predetermined distance; a grid frame secured to the plurality of bars and the plurality of backstraps, wherein the grid frame surrounds the plurality of bars and the plurality of backstraps to form a rectangular section, a first curvature at anterior end of the rectangular section and a second curvature at posterior end of the rectangular section, wherein the plurality of bars are secured to the first and second curvatures formed by the grid frame; a lead ring formed by a first curved section, a second curved section and a straight section, wherein first end of the first curved section and first end of the second curved section are secured to the straight section and the grid frame; a plurality of setbacks positioned between the first curved section of the lead ring and the grid frame to form a first side panel and between the second curved section and the grid frame to form a second side panel, wherein the first and second side panels formed by the plurality of setbacks support the lead ring to funnel the marine species entering the trawl towards the plurality of bars; and a plurality of terminal couplers for securing the ends of each of the plurality of setbacks with the ends of the plurality of back straps and the grid frame, wherein said apparatus is adapted for insertion within the trawl body before cod end of the trawl net, wherein the lead ring is secured to fishing circle in the trawl net along a row of meshes perpendicular to the longitudinal axis of the trawl net, and wherein the undesired marine species exit the trawl net through the opening formed at the posterior end of the apparatus.

More particularly, the lengths of the setbacks positioned between the lead ring and the grid frame decrease from the distal end of the lead ring to the proximal end of the lead ring such that a plane of lead ring is set at a predetermined angle with a plane of the grid frame, and wherein the setbacks are spaced apart by at least the second predetermined distance. In one embodiment of the present invention, the angle between the plane of the lead ring and the plane of the grid frame is about 30 degrees. In some embodiments, the setbacks positioned between a second end of the first curved section of the lead ring and the grid frame and between a second end of the second curved section of the lead ring and the grid frame are secured to the grid frame and at least one of the plurality of backstraps using a four-way knuckle. In one aspect of the present invention, the first ends of the first and second curved sections of the lead ring are secured to the straight section of the lead ring and the grid frame using a four-way knuckle. In another aspect of the present invention, the back strap positioned at a center of the grid frame comprises two cables combined to form a single back strap.

In one embodiment of the present invention, the spacing separating the plurality of bars is about 6 inches and the distance separating the ends of back straps is about 24 inches. In another embodiment of the present invention, the length of the plurality of back straps is about 40 inches.

In some embodiments of the present invention, the bars positioned proximal to the center bar is longer than the at least one of the bars positioned proximal to a side of the grid frame and the center bar is secured to the grid frame at apex of the first and second curvatures formed by the grid frame.

Some embodiments of the present invention further include floats secured to predetermined locations on the bars to provide buoyancy to the apparatus.

In some aspects of the present invention, the lead ring and the grid frame are positioned inside a grid frame extension webbing.

Other embodiments of the present invention further include a lead extension panel secured to the lead ring and the grid frame, wherein the lead extension panel extends the grid frame extension webbing outside the lead ring; and a transition piece webbing for transitioning a shape of the trawl net from a two-seam trawl net to a four-seam trawl net, wherein the transition piece webbing comprises two top side panels, two bottom panels, a bottom belly panel, and a top belly panel, wherein the side panels, the bottom panels, the bottom belly panel, and the top belly panel of the transition piece webbing are secured using eight gore lines. More particularly, the bottom belly directs the marine species towards the grid frame, and wherein the bottom belly extends inside the grid frame extension webbing to form a ramp and transitions into a flap.

Embodiments of the present invention also relate to an apparatus for excluding undesired marine species from a trawl net during trawling, including a first grid panel comprising a plurality of first bars arranged horizontally in a symmetrical layout on either side of a first center bar, wherein each of the plurality of first bars is secured to at least one of a plurality of first back straps at a predetermined location, wherein the plurality of first bars are spaced apart by at least one predetermined distance, wherein each of the plurality of first bars has a predetermined length, wherein each of the plurality of first back straps is positioned perpendicular to the plurality of first bars; a second grid panel comprising a plurality of second bars arranged horizontally in a symmetrical layout on either side of a second center bar, wherein each of the plurality of second bars is secured to at least one of a plurality of second back straps at a predetermined location, wherein the plurality of second bars are spaced apart by at least one predetermined distance, wherein each of the plurality of second bars has a predetermined length, wherein each of the plurality of second back straps is positioned perpendicular to the plurality of second bars; a center post connecting the first and second grid panels, wherein proximal ends of the plurality of first and second bars are secured to the center post; a rectangular lead ring connected to the ends of the center post, wherein the longitudinal axis of the lead ring is perpendicular to the center post; a plurality of setbacks positioned between the first and second grid panels and the lead ring to support the first and second grid panels in a V-shape; a plurality of terminal couplers for securing the ends of each of the plurality of the first and second back straps and the proximal ends of the plurality of the first and second bars to the center post, wherein the plurality of terminal couplers secure the plurality of setbacks to the first and second grid panels and the lead ring, wherein said apparatus is adapted for insertion within the trawl body before cod end of the trawl net, wherein lead ring is secured to fishing circle in the trawl net along a row of meshes perpendicular to the longitudinal axis of the trawl net, and wherein the back straps are secured to the top quarter of extension panel in the trawl net. More particularly, each of the plurality of setbacks is positioned at substantially same locations as the plurality of the first and second back straps. In one embodiment of the present invention, each of the plurality of back straps is a 6×19 stainless steel cable, and wherein each of the plurality of back straps is a 6×19 stainless steel cable. In another embodiment of the present invention, each of the first and second grid panels have a length of about 5 feet and a height of about 3 feet.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
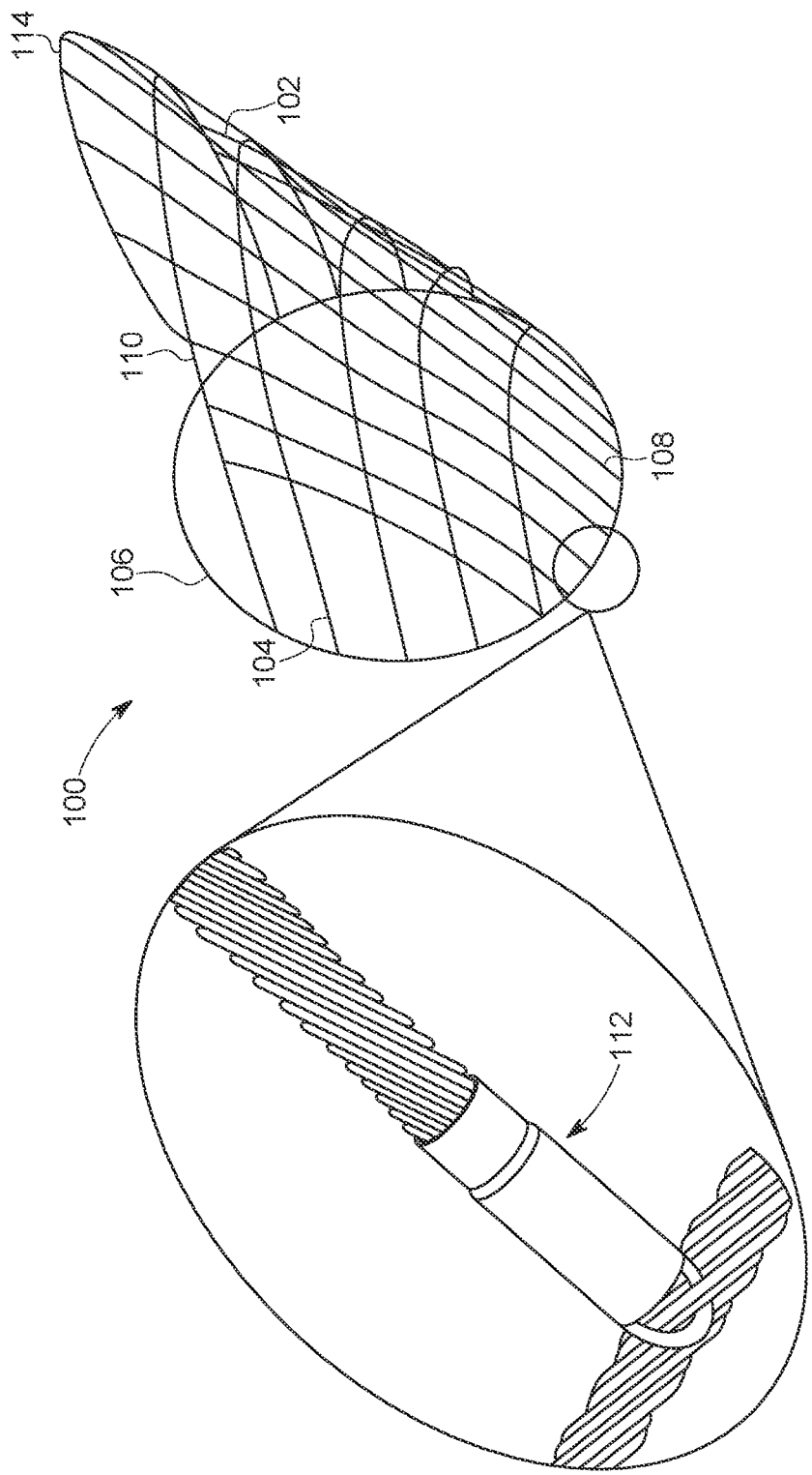
FIG. 1 illustrates a marine species sorting apparatus in accordance with an embodiment of the present invention.

Referring now to the drawings, and more particularly, to FIG. 1, there is shown an apparatus for sorting marine species during trawling, generally designated 100, which comprises embodiments of the present invention. Marine species sorting apparatus 100 includes grid 102, back straps 104, and lead ring 106. Grid 102 includes a plurality of bars 108 surrounded by grid frame 110. Grid frame 110 surrounding bars 108 form an opening at posterior end of grid 102 to allow for the undesired marine species to exit the trawl net. Grid frame 110 is attached to lead ring 106 at an angle using terminal couplers 112. Lead ring 106 supports grid 102 and secures marine species sorting apparatus 100 in trawl webbing referred to as the extension.

Grid 102 includes a plurality of bars 108, each having a predetermined length and separated from each other by a predetermined bar spacing. Bars 108 are formed by cable or wire rope having a predetermined stiffness. In an embodiment of the present invention, bars 108 are made of 1×19 stainless steel cables. Each cable or wire rope include multi-wire strands arranged around a core. As used herein, the term "strand" refers to a grouping of wires wound together into individual cords that together make a wire rope. A wire rope is typically denoted by the number of strands, the number of wires in each strand and a description of its construction. For example, 1×19 cable denotes a wire rope that includes 1 strand made from 19 wires, and 6×19 IWRC denotes a wire rope including 6 strands having 19 wires per strand with 6 strands arranged around 1 Independent Wire Rope Core (IWRC). Typically, a 1×19 cable is stiffer than 6×19 IWRC, provided that they are both made of the same material with same overall diameter.

Figure 2:
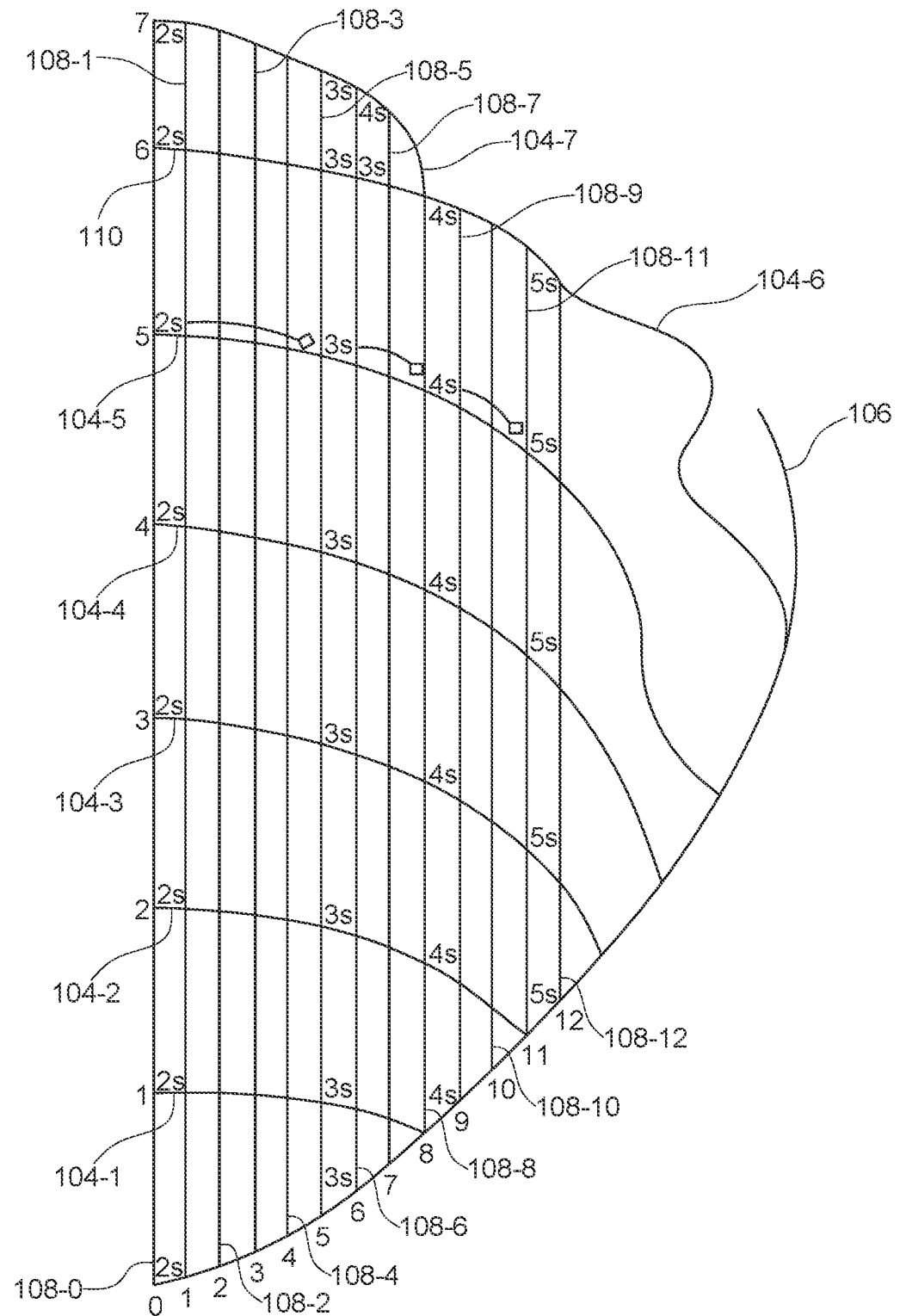
FIG. 2 illustrates an exemplary layout representing half grid of marine species sorting apparatus in accordance with an embodiment of the present invention.

Bars 108 are arranged in a predetermined layout. FIG. 2 illustrates an exemplary layout representing half grid for an embodiment of marine species sorting apparatus 100. In one embodiment of the present invention, bars 108 are arranged in a symmetrical layout on either side of a center bar 108-0 extending along a direction substantially traversing longitudinal axis of the trawl net. In another embodiment of the present invention, bars 108 are arranged vertically in a symmetrical layout on either side of a center bar 108-0, as shown in FIGS. 1 and 2. Bar 108-1 is positioned next to bar 108-0 and bar 108-12 is positioned farthest away from bar 108-0, as shown in FIG. 2. In the embodiment shown in FIGS. 1 and 2, bar 108-0 is the longest bar and bar 108-12 is the shortest bar. The bottom end of each of bars 108-0 to 108-12 is connected to lead ring 106.

Back straps 104 are cables positioned perpendicular to bars 108 to provide support to bars 108 and fix the spacing between bars 108. Back straps 104 are typically softer and flexible cable than bars 108. In an embodiment of the present invention, back straps 104 are made of the 6×19 cables. The difference in cables types determines the function of the cable grid. Stiffer cable helps maintain spacing between bars 108, and more yielding cables in grid frame 110 and back straps 104 allow grid 102 to compact and reengage as marine species sorting apparatus 100 is crushed on a net reel and then deployed repeatedly. In the embodiment shown in FIGS. 1 and 2, back straps 104 are arranged horizontally with shortest back strap 104-1 at the bottom of grid 102 and the longest back strap 104-6 at the top of grid 102. Back strap 104-6 is the longest backstrap and forms grid frame 110 around the opening at the posterior end of grid 102. Back strap 104-6 is also referred to as the Opening Back Strap (OBS). Anchored to back strap 104-6 is a grid frame extension (GFE) 114, which is also referred to as the last back strap and shown as back strap 104-7 in FIG. 2. Back straps 104 positioned in the middle or the upper portion of grid 102 influence the slope of bars 108. In an exemplary embodiment of the present invention, back straps 104 positioned in the middle or the upper portion of grid 102 provide bars 108 with a slope having an angle of about 45 degrees. In another embodiment of the present invention, back straps 104 positioned in the middle or the upper portion of grid 102 provide bars 108 with a slope having a staggered pitch. By adjusting the length of back straps 104 between lead ring 106 and last bar 108-12, grid 102 can have a steep angle at the bottom and a gradual slope at the top or vice versa.

Cable grid 102 is made with a series of bars 108 secured to back straps 104. In one embodiment of the present invention, bars 108 are secured to back straps 104 using tuck splicing. Tuck splicing can be used to achieve a balance between flexibility and consistency in grid 102 by maintaining a consistent bar spacing and a fixed layout of grid 102. While the splicing holds bars 108 tightly to back straps 104, it allows for some movement when marine species sorting apparatus 100 is compressed for storage. When marine species sorting apparatus 100 is deployed and fishing, the splicing allows for bars 108 to form a well-defined grid.

Bars 108 are secured to back straps 104 at predetermined locations to maintain consistent bar spacing for a predetermined grid layout. In one embodiment of the present invention, bar spacing corresponds to the number of strands on each of back straps 104 between each of bars 108 and the corresponding tuck splice. In an exemplary layout shown in FIG. 2, the strand count for each of back straps 104 can be found between each of bars 108. In FIG. 2, the number followed by the letter "s" on the layout denotes the number strands between each bar and the tuck splice, which corresponds to a bar spacing. For example, "3s" denotes 3 back strap strands between a bar and the tuck splice and corresponds to a bar spacing of about 3 inches. In a typical embodiment of the present invention, bar spacing at the central region of grid 102 is narrower than the bar spacing along the sides of grid 102. Bar spacing along the sides of grid 102 is increased to compensate for the transition between the flat center of grid 102 to the curved sides of grid 102. In one embodiment of the present invention, bar spacing at the central region of grid 102 is about 3 inches. The ends of bars 108 that are farthest from the opening at the posterior end of grid 102 are secured to lead ring 106 and the ends of bars 108 positioned at or closer to the opening at the posterior end of grid 102 are secured to GFE 114.

Figure 4:
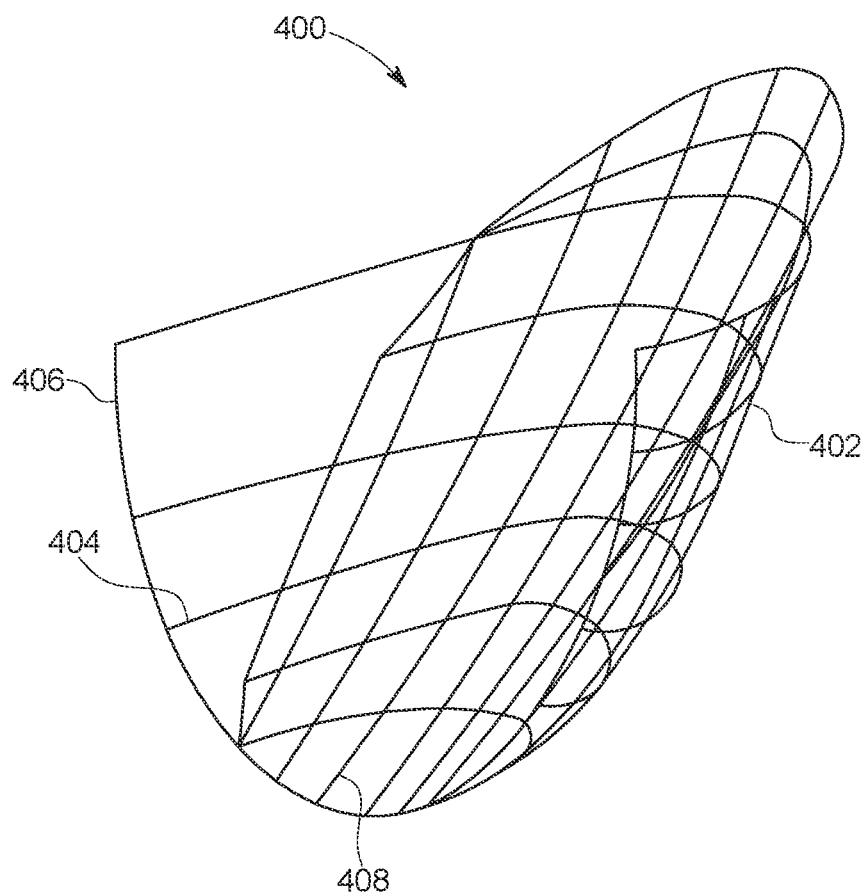
FIG. 4 illustrates a second embodiment of marine species sorting apparatus in accordance with an embodiment of the present invention.
Figure 5:
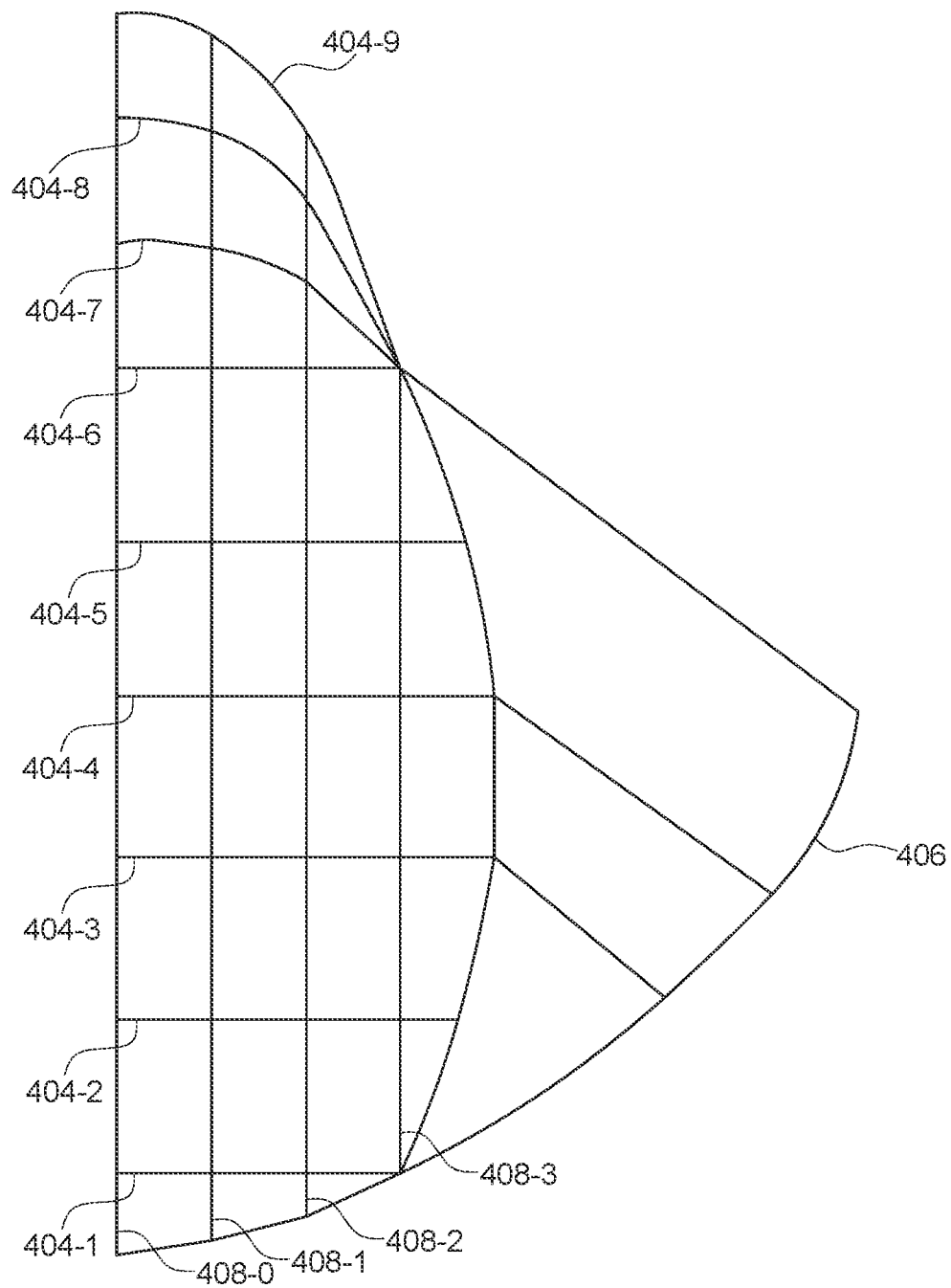
FIG. 5 illustrates an exemplary layout representing half grid of marine species sorting apparatus in accordance with the second embodiment of the present invention.

Back straps 104 are positioned perpendicular to bars 108, and parallel to each other with a predetermined space between each other and with a degree of offset. The length of back straps 104 are shortest when positioned away from the opening at the posterior end of grid 102 and longest when positioned at or closer to the opening at the posterior end of grid 102. In the layout shown in FIG. 2 for an exemplary embodiment in accordance with the present invention, the distance between the back straps is denoted on the layout. The distance between back straps 104 is determined by measuring and marking locations of the tucks on bars 108. The distance and placement of the marks for tuck splicing can be found on the layout. Parallel back straps 104 with consistent distance between them are obtained when back straps 104 are spliced to the appropriate tuck marks on bars 108. The distance between back straps 104 is shorter towards the lead ring and farthest apart at the center bar 108-0. In some embodiments of the present invention, back straps 104 at the center of grid 102 are parallel, as shown in FIGS. 4 and 5. Back straps 104 fold around from the center to the sides of grid 102 to allow bars 108 located at the corners of grid 102 to shift and realign such that bar spacing at the corners and sides of grid 102 become comparable to the bar spacing at the center of grid 102 when grid 102 is submerged in ocean for fishing.

Flexibility of bars 108 can be limited by bar spacing. The spacing between back straps 104 can also be used to control bar spacing between two parallel bars having a predetermined degree of flex. Narrower spacing between back straps 104 can result in stiffer bars 108. Using fewer back straps 104 in grid 102 can result in a lighter grid 102. In an exemplary embodiment of the present invention, using a ½-inch cable for 1×19 bars and 9/16-inch cable for 6×19 back straps with 18 inches spacing between back straps and a bar spacing of about 3.5 inches can result in a grid capable of enduring more than 40 lbs. of force and spread the bars apart no more than ½-inch while the net is under tow. Stiffer cable bar material (such as 9/16 in. or larger diameter) allows for increased spacing between back straps 104, or allows for the use of fewer back straps 104.

Back straps 104 achieve a parabolic shape when marine species sorting apparatus 100 is submerged in ocean and deployed for fishing. The parabolic shape is achieved using setback in back straps 104. Setback is the length of back straps 104 between lead ring 106 and the last bar 108-12. Setbacks maintain the center of cable grid 102 at a predetermined angle. The shape of the parabola required for a predetermined setback of back straps 104 is set by varying the lengths of back straps 104. Lengths of back straps 104 decreases from back strap 104-6 to back strap 104-1 such that back strap 104-6 forms the width of the parabola. Length of back strap 104-6 that forms the width of the parabola is further determined by the length of the opening at the posterior end of grid 102 in trawl net. The manner in which back strap 104-6 (OBS) and GFE 114 are secured to the webbing at the opening in trawl net will determine the width and shape of grid 102 at the opening. In one embodiment of the present invention, the dimensions of the opening are selected to maintain a shallow dip of at least three meshes below the first mesh of the forward cut in the bosom section to round the grid at the opening. Lengths of back straps 104 further influences the distance between lead ring 106 and the opening section of grid 102.

In some embodiments of the present invention, back strap 104-6 (or the OBS) can be modified to form a grid frame extension 114 at the top of grid 102, as further shown in FIGS. 1 and 2. Grid frame extension 114 increases the surface area of grid 102 while reaching up into a flap netting positioned over an opening at the posterior end of grid 102, and sealing the flap netting to grid 102 by increasing the length of grid 102 exclusively at the bosom section of grid 102 at the opening. Grid frame extension 114 is formed by anchoring an additional back strap 104-7 to back strap 104-6, as shown in FIGS. 1 and 2. Back strap 104-7 will be referred to as the Grid Frame Extension (GFE). Each of bars 108-0 through 108-6 is extended to connect with back strap 104-7 such that bar 108-0 is positioned at the apex of grid frame extension 114. In one embodiment of the present invention, bar 108-0 is extended by about 12 inches longer than the original length. Each of bars 108-0 through 108-6 terminating at back strap 104-7 is connected to back strap 104-7 using a terminal coupler 112 and secured to back strap 104-6 using tuck splicing. In some embodiments of the present invention, the dimensions of terminal coupler 112 located at the center of grid frame extension 114 is selected to accommodate a cable including about three strands. Back strap 104-7 is capable of forming an arch having a greater degree of curvature than back strap 104-6. Accordingly, the strand count on back strap 104-7 may differ from the strand counts on back strap 104-6. Bars 108-0 through 108-6 are secured to back strap 104-6 and the ends of bars 108-0 through 108-7 are anchored to back strap 104-7. The ends of back strap 104-7 are anchored to back strap 104-6 at predetermined locations. Table 1 provides exemplary dimensions for back straps 104, bars 108, lead ring 106, bar spacings, and back strap spacings along center bar 108-0 for the exemplary embodiment (Type I) shown in FIG. 2.

TABLE 1

Type I Cable Grid
(FIGS. 1-2)

| Cable Type | Cable Length |
|---|---|
| Lead Ring | 18'10" |
| Bars | |
| 0 | 10' |
| 1 | 9'11" |
| 2 | 9'9" |
| 3 | 9'7" |
| 4 | 9'4" |
| 5 | 9'1" |
| 6 | 8'9" |
| 7 | 8'5" |
| 8 | 7'5" |
| 9 | 7'1" |
| 10 | 6'8" |
| 11 | 6'3" |
| 12 | 5'8" |
| Backstraps | |
| 1 | 4'6" |
| 2 | 6'8" |
| 3 | 9' |
| 4 | 12' |
| 5 | 16' |
| 6 | 25'3" |
| 7 | 6'6" |
| Backstraps | Distance between backstraps at bar 0 |
| 0-1 | 24" |
| 1-2 | 18" |
| 2-3 | 18" |
| 3-4 | 18" |
| 4-5 | 18" |
| 5-6 | 12" |
| 6-7 | 12" |

Figure 3:
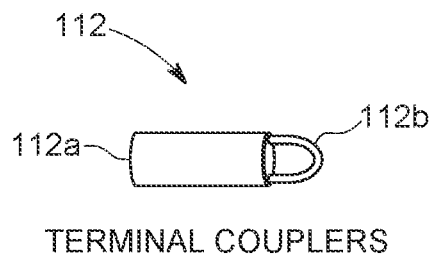
FIG. 3 illustrates exemplary terminal couplers used in embodiments of the present invention.
Figure 3:
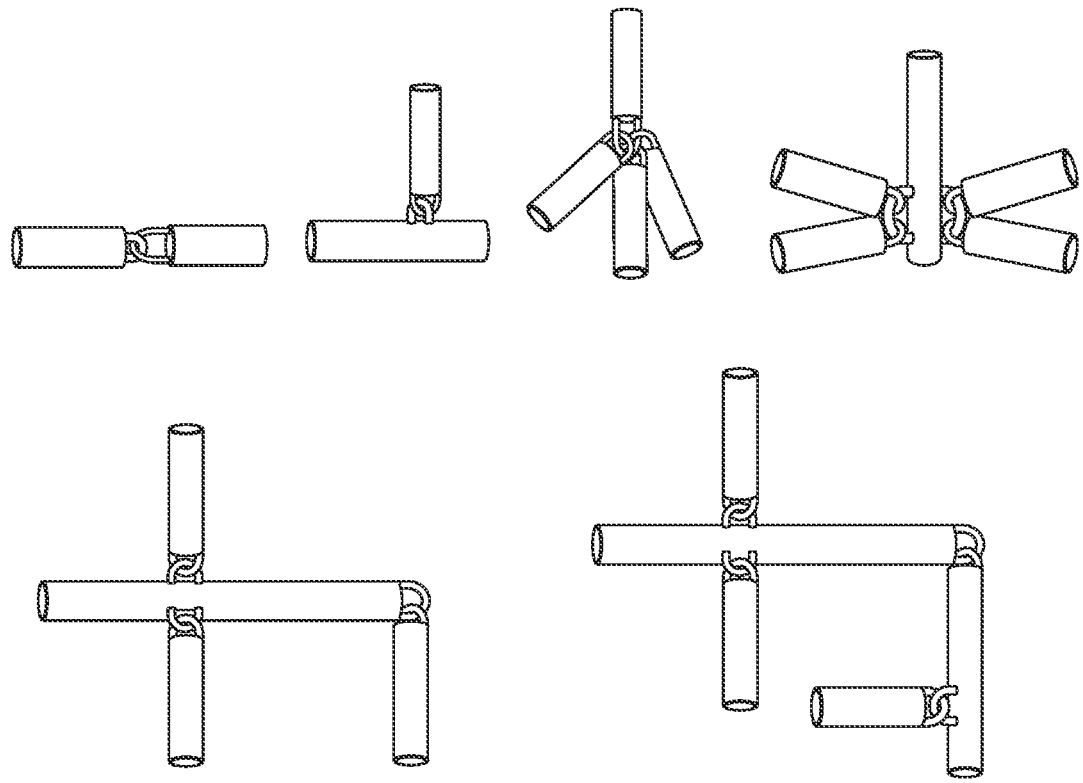

The ends of each of back straps 104 and one end of each of bars 108 are anchored to lead ring 106 using terminal couplers 112. In some embodiments of the present invention, the number of terminal couplers 112 needed for cable grid 102 can be determined by multiplying the total number of bars 108 and back straps 104 by two. In one embodiment of the present invention, each of terminal couplers 112 is a cylindrical pipe with one open end 112a for receiving each of back straps 104 and each of bars 108 and a half-ring link 112b welded to the second end of the pipe, as shown in FIG. 3. The diameter of open end 112a is selected to receive back straps 104 and bars 108. The length of terminal couplers 112 can range from about 2 inches to about 6 inches. In one embodiment of the present invention, terminal couplers 112 can be made of ½-inch s-40 (304) Stainless steel. The diameter of half-ring link 112b can be about a one-quarter inch. The ends of each of back straps 104 and each of bars 108 are inserted into open end 112a of terminal couplers 112 and secured by crimping open end 112a. Terminal couplers 112 can be linked or welded together to have multiple open ends for anchoring multiple back straps 104 and bars 108 to one location, or to form knuckles or corners, as further shown by exemplary embodiments of terminal couplers 112 in FIG. 3. In one embodiment of the present invention, terminal couplers 112 having two open ends are used to anchor one of back straps 104 and one of bars 108 to the same predetermined location on lead ring 106.

Terminal couplers 112 anchored to lead ring 106 are oriented in the same direction and are positioned at predetermined locations on lead ring 106. In one embodiment of the present invention, terminal couplers 112 are oriented in a direction substantially facing the posterior end of marine species sorting apparatus 100. Terminal couplers 112 are anchored to lead ring 106 by locking half-ring link 112b on lead ring 106 at predetermined locations on lead ring 106. In one embodiment of the present invention, each half-ring link 112b of terminal couplers 112 are locked into position on lead ring 106 by unwinding a pair of strands on lead ring 106 to the predetermined location on lead ring 106, inserting the unwound pair of strands through the eye of half-ring link 112b, sliding half-ring link 112b to the predetermined location, and winding the pair of strands to anchor half-ring link 112b to the predetermined location on lead ring 106. In one embodiment of the present invention, spacing between terminal couplers 112 anchored to lead ring 106 correspond to the relative distance between back straps 104 on lead ring 106. In another embodiment of the present invention, spacing between terminal couplers 112 anchored to lead ring 106 correspond to the relative bar spacing between each of bars 108 terminating at lead ring 106, grid frame extension 114 or back strap 104-6. Terminal couplers 112 can provide a pivoting joint while limiting the ability of each of back straps 104 and each of bars 108 to twist. A desired layout of grid 102 can be maintained with the combined ability of terminal couplers 112 to limit the twisting of each of bars 108 and the ability of each tuck splicing to maintain a consistent bar spacing.

Lead ring 106 is located along the bottom of grid 102 and forms a foundation for cable grid 102. Lead ring 106 anchors back straps 104 into the fishing circle of a trawl and positions bars 108 of grid 102 away from the opening. Lead ring 106 serves as a vertical base to offset back straps 104 and hold bars 108 at an angle. The bottom end of bars 108 are secured to the bottom center section of lead ring 106 and back straps 104 are secured along either side of lead ring 106.

In one embodiment of the present invention, lead ring 106 is formed by connecting the ends of a cable into a circle to form a round hoop, as shown in FIG. 1. Connections can be made by inserting each end of lead ring 106 into the open ends of a cylindrical pipe and crimping the pipe to secure the ends of lead ring 106 to the pipe. Lead ring 106, as shown in FIG. 1, can be used to funnel large volume catches that push down the trawl bellies towards grid 102. In embodiments of the present invention, as shown in FIG. 1, cable grid frame 110 is parabolic resulting in a grid that has more area for sorting fish than a flat rigid grid of same height and width. Embodiments of the present invention, as shown in FIG. 1, are suitable for use with high profile trawls (HPT). Exemplary high-profile trawls include a Flynet fish trawl, Midwater trawls, four seam box nets, fish trawls having circular cross section at the tail end of the bellies, and the like.

Figure 6:
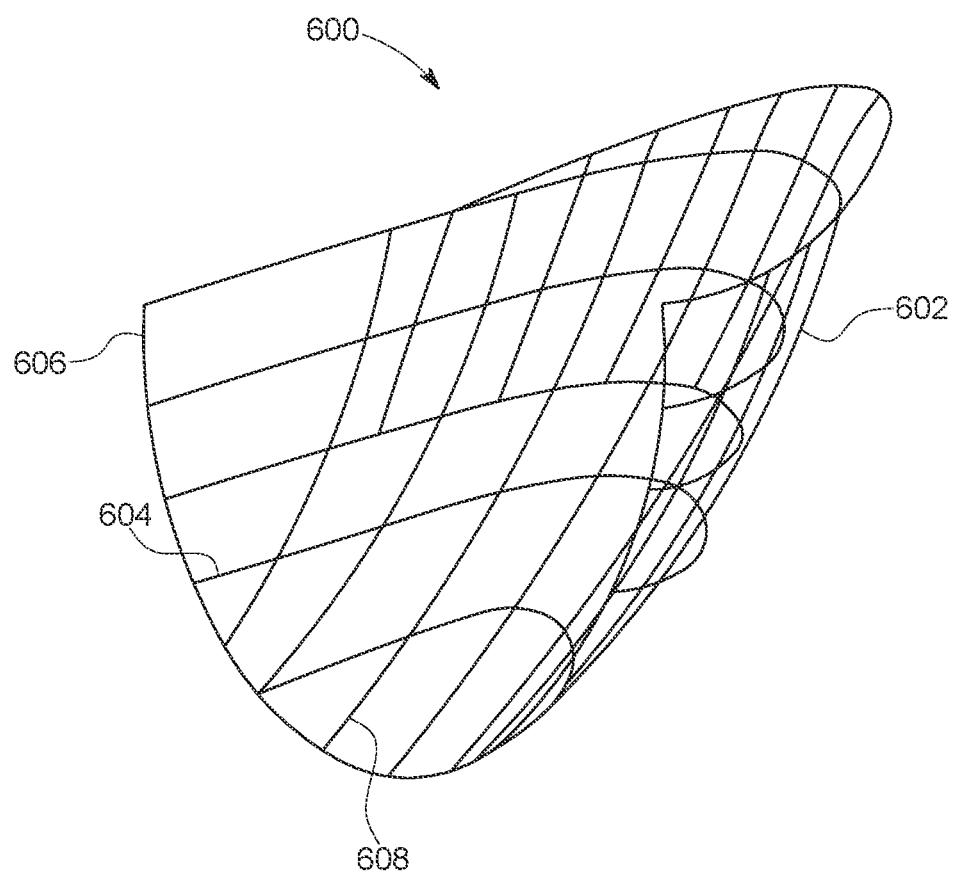
FIG. 6 illustrates another embodiment of marine species sorting apparatus having an alternate layout of bars and back straps.
Figure 7:
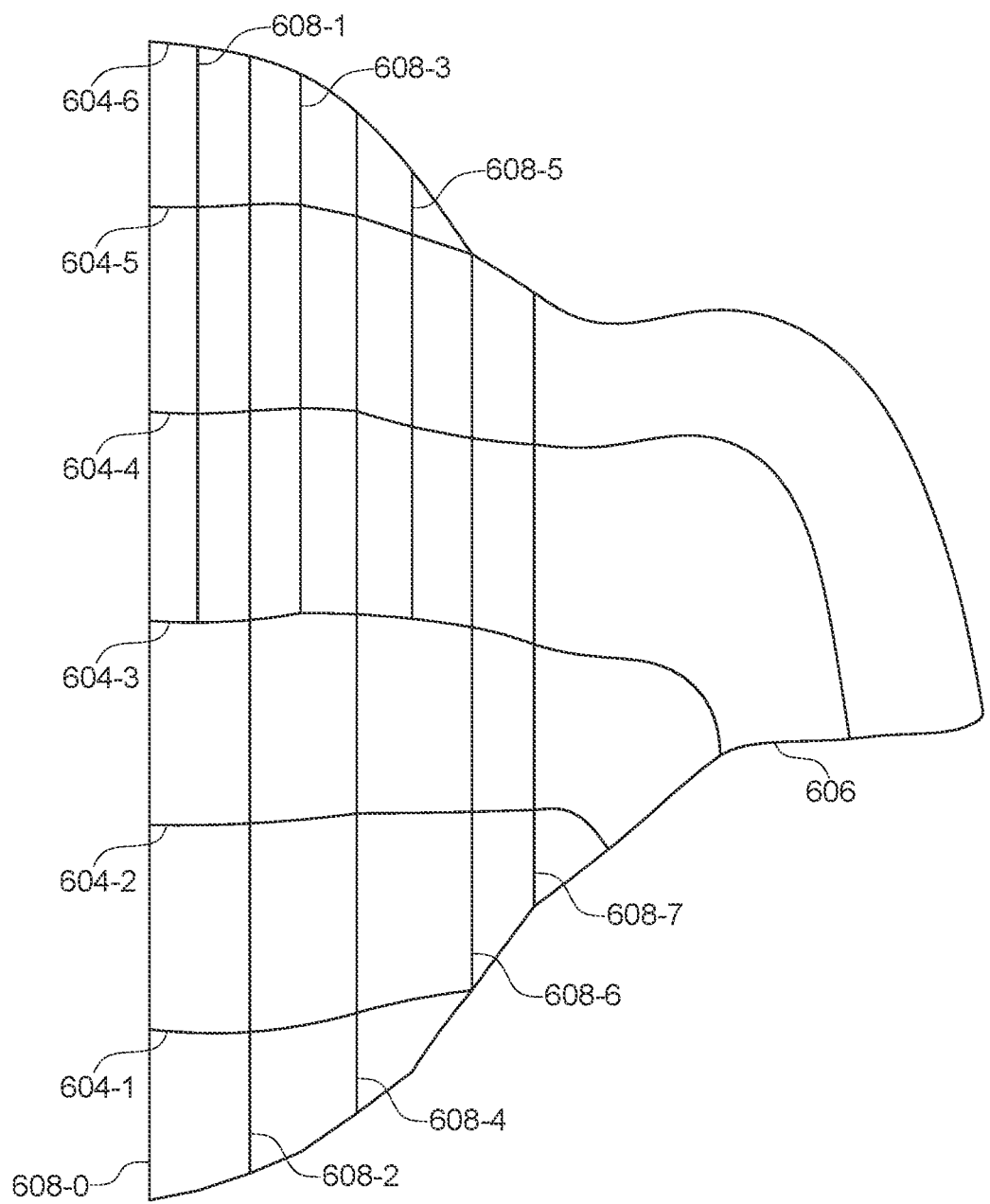
FIG. 7 illustrates an exemplary layout representing half grid of marine species sorting apparatus having alternate layout of bars and back straps.

FIG. 4 illustrates a marine species sorting apparatus 400 in accordance with a second embodiment of the present invention, including a lead ring 406 that is a semi-circular hoop formed by securing each end of lead ring 406 to back strap 404-6 to open the top of lead ring 406, as shown in FIGS. 4 and 5. FIG. 5 illustrates an exemplary layout representing half grid of marine species sorting apparatus 400. Lead ring 406 serves as a vertical base to offset back straps 404 and hold bars 408 at an angle. The bottom end of bars 408 are secured to the bottom center section of lead ring 406. FIG. 6 illustrates another embodiment of marine species sorting apparatus having an alternate arrangement of bars and backstraps, as shown in the exemplary layout of FIG. 7. Table 3 provides exemplary dimensions of back straps, bars, lead ring, bar spacings, and back strap spacings along the center bar for the exemplary embodiments (Type II-i and Type II-ii) shown in FIGS. 5 and 7.

TABLE 2

| Type II-i Cable Grid (FIGS. 4-5) | | Type II-ii Cable Grid (FIGS. 6-7) | |
|---|---|---|---|
| Cable Type | Cable Length | Cable Type | Cable Length |
| Lead Ring | 13'2.5" | Lead Ring | 10' |
| Bottom | 3'10.5" | | |
| Sides | 4'8" | | |
| Bars | | Bars | |
| 0 | 8' | 0 | 7'6" |
| 1 | 7'9" | 1 | 3'9" |
| 2 | 7' | 2 | 7'3" |
| 3 | 5' | 3 | 3'6" |
| | | 4 | 6'5" |
| | | 5 | 2'11" |
| | | 6 | 4'10" |
| | | 7 | 3'10" |
| Backstraps | | Backstraps | |
| 1 | 3'6" | 1 | 3'4" |
| 2 | 4'2" | 2 | 5' |
| 3 | 4'8" | 3 | 6'4" |
| 4 | 4'8" | 4 | 7'11" |
| 5 | 4'2" | 5 | 9'6" |
| 6 | 3'6" | 6 | 4'6" |
| 7 | 4'3" | | |
| 8 | 5'2" | | |
| 9 | 6'5.5" | | |
| Set Back | | | |
| 1 | 1'5" | | |
| 2 | 2'1" | | |
| 3 | 3'6" | | |
| Backstraps | Distance between backstraps at Bar 0 | Backstraps | Distance between backstraps at Bar 0 |
| 0-1 | 0.5" | 0-1 | 1'1" |
| 1-2 | 1' | 1-2 | 1'4" |
| 2-3 | 1' | 2-3 | 1'4" |
| 3-4 | 1' | 3-4 | 1'4" |
| 4-5 | 1' | 4-5 | 1'4" |
| 5-6 | 1' | 5-6 | 1'1" |
| 6-7 | 9" | | |
| 7-8 | 9" | | |
| 8-9 | 9" | | |

Embodiments of the present invention, as shown in FIGS. 4 and 6, are suitable for use with low-profile trawls (LPT), which have limited head rope height that translates into a vertically compressed fishing circle in the body with flat top and bottom bellies and results in a rectangular fishing circle extending as far back as the tail of the net ahead of the cod end. Exemplary low-profile trawls include flat net shrimp trawl, scraper trawls, and the like. The semicircular shape of lead ring 406 allows for the sides of lead ring 406 to spread out and open the face of grid 302, and vertically compress the shape of marine species sorting apparatus 400 to compliment the shape of the LPT at an installation site located within the tail of LPT. The semicircular shape of lead ring 406 further allows for the top of the extension section of LPT to stretch and flatten, which levels the leading edge of the LPT opening to allow the flap to lay flat and cover the opening with a tight seal.

Figure 8:
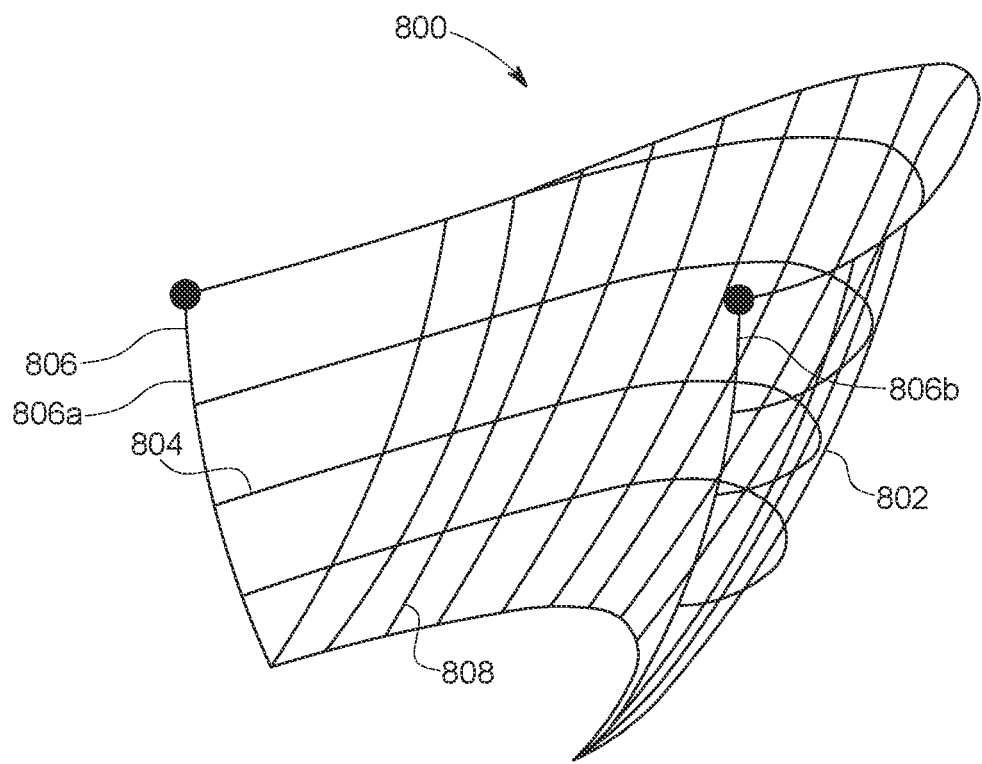
FIG. 8 illustrates a third embodiment of marine species sorting apparatus in accordance with an embodiment of the present invention.
Figure 9:
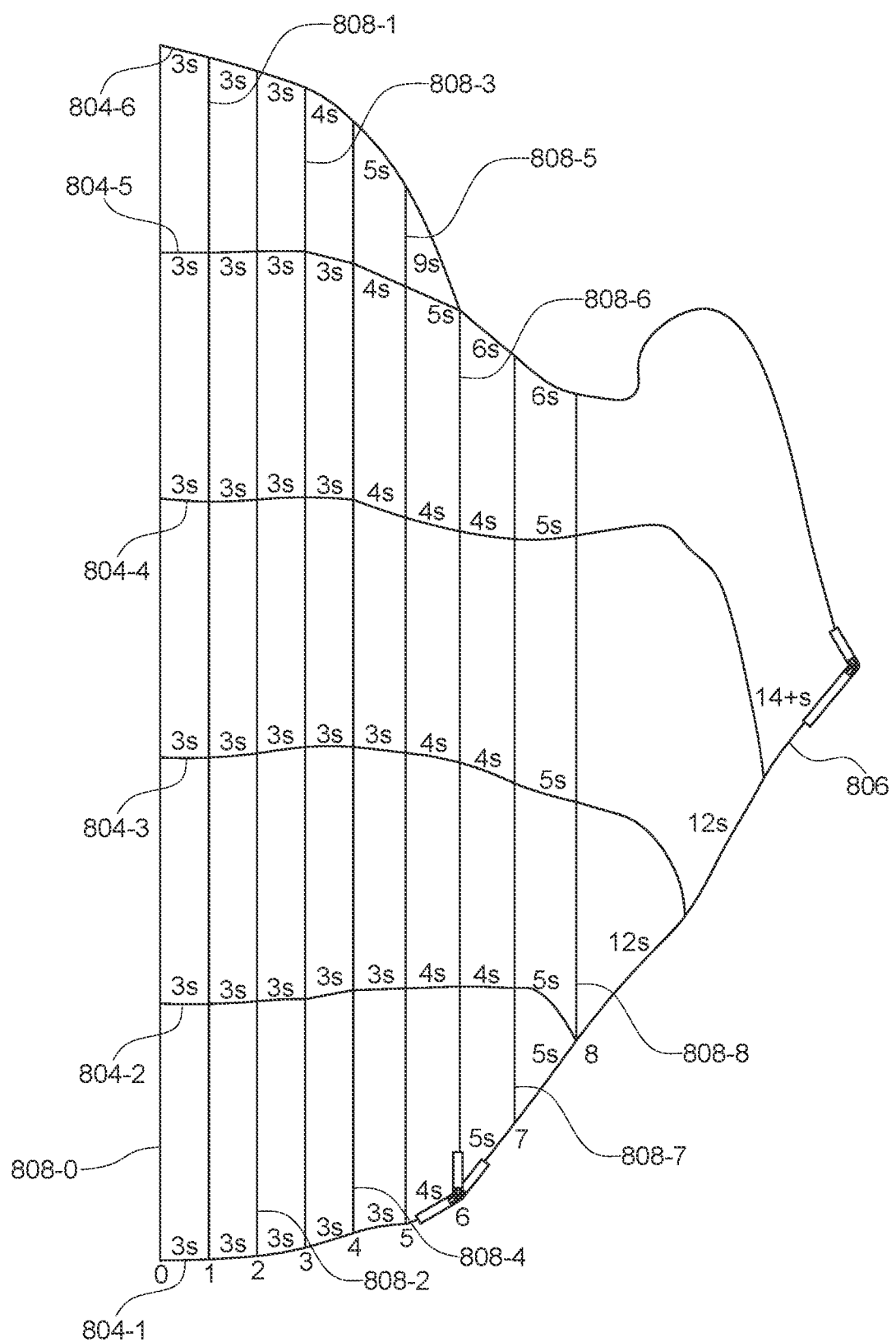
FIG. 9 illustrates an exemplary layout representing half grid of marine species sorting apparatus in accordance with the third embodiment of the present invention.

FIG. 8 illustrates a marine species sorting apparatus 800 in accordance with a third embodiments of the present invention, including a lead ring 806 formed by two cables 806a and 806b located along the sides of grid 802 to provide a base for anchoring back straps 804 to lead ring 806 along sides of grid 802, as shown in FIG. 8. Each end of back strap 804-5 is secured to top ends of lead ring cables 806a and 806b, respectively, and the bottom ends of bars 808 are secured to back strap 804-1 to form lead ring 806 that is open at the top and bottom, as further shown in FIGS. 8 and 9. FIG. 9 illustrates an exemplary layout representing half grid of marine species sorting apparatus 800. Table 3 provides exemplary dimensions of back straps, bars, lead ring, bar spacings, and back strap spacings along the center bar for the exemplary embodiment (Type II-iii) shown in FIG. 9.

TABLE 3

| Type II-iii Cable Grid (FIGS. 8-9) | |
|---|---|
| Cable Type | Cable Length |
| Lead Ring | 7' |
| Sides | 3'6" |
| Bars | |
| 0 | 6'8" |
| 1 | 6'6" |
| 2 | 6'6" |
| 3 | 6'5" |
| 4 | 6'3" |
| 5 | 6' |
| 6 | 5' |
| 7 | 4'2" |
| 8 | 3'9" |
| Backstraps | |
| 1 | 3'4" |
| 2 | 6' |
| 3 | 7'4" |
| 4 | 9'2" |
| 5 | 12' |
| 6 | 4'6" |
| Backstraps | Distance between backstraps |
| 0-1 | 1'6.5" |
| 1-2 | 1'4" |
| 2-3 | 1'4" |
| 3-4 | 1'4" |
| 4-5 | 1'4" |
| 5-6 | 1'2" |

Figure 10:
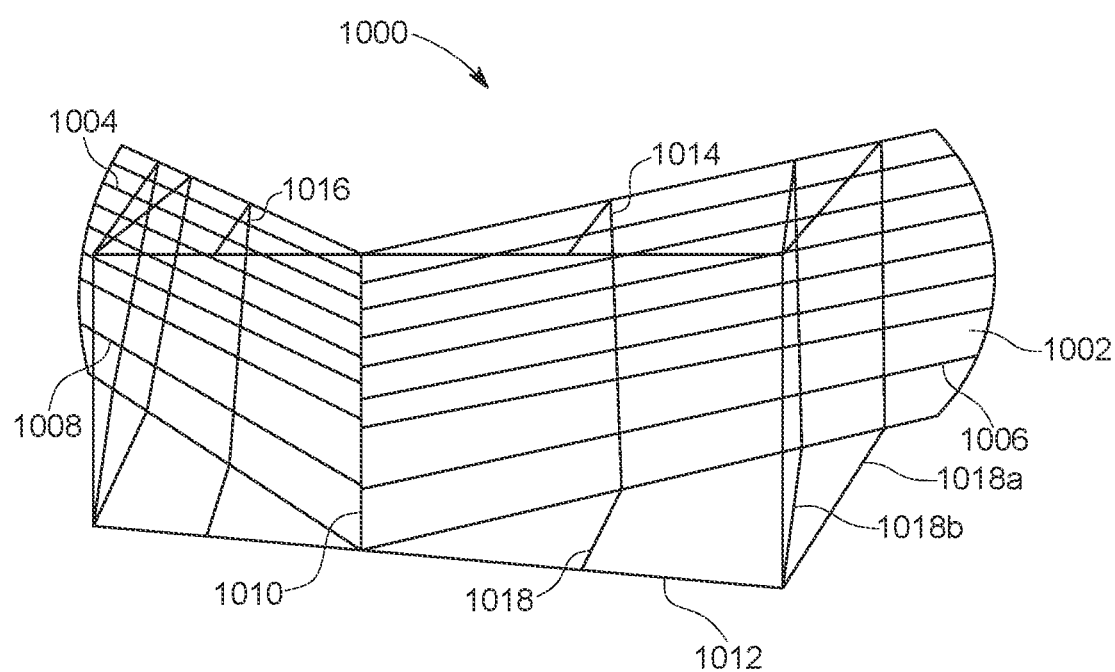
FIG. 10 illustrates an alternate embodiment of the present invention for sorting marine species having a flat horizontal shape.
Figure 11:
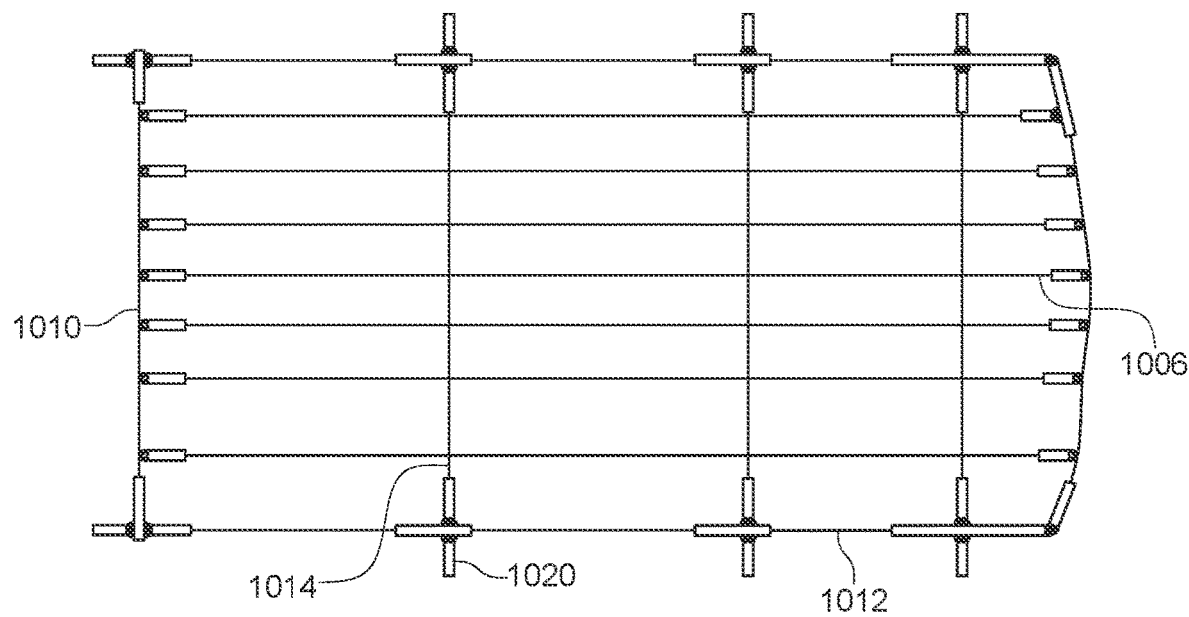
FIG. 11 illustrates an exemplary layout representing half grid of marine species sorting apparatus having a flat horizontal shape.

FIG. 10 illustrates an alternate embodiment of the present invention for sorting marine species having a flat horizontal shape, including various varieties of flounders. Exemplary varieties of flounders include *Paralicthys dentatus, Pleuronectes* sp., and the like. As shown in FIG. 10, two cable grids 1002 and 1004 are oriented on its side and connected to form a V-shaped grid. Cable grids 1002 and 1004 include bars 1006 and 1008 that are anchored to vertical back straps 1014 and 1016 and are oriented in horizontal direction with sufficient bar spacing to allow the passage of flat marine species. Marine species that do not pass through bars 1006 are discharged from the trawl net through grid openings positioned on the sides of trawl net. In one embodiment of the present invention, cable grids 1002 and 1004 is made from two panels with each panel having a length of about 5 feet and a height of about 3 feet. Cable grids 1002 and 1004 are connected at the center by a vertical lead center post 1010. In one embodiment of the present invention, cable grids 1002 and 1004 are connected at the center by anchoring bars 1006 to vertical lead center post 1010. Vertical lead center post 1010 is further connected to lead ring 1012. In one embodiment of the present invention, lead ring 1012 is rectangular shaped and is suitable for use with a LPT having four seams at the tail of the net. Bars 1006 and 1008 are secured to back straps 1014 and 1016, respectively, at predetermined locations on back straps 1014 and 1016 to maintain consistent bar spacing for a predetermined grid layout. Back straps 1014 and 1016 are positioned perpendicular to bars 1006 and 1008, and parallel to each other, with a predetermined space between each other and with a degree of offset. Setbacks 1018 between cable grids 1002 and 1004 and lead ring 1012 are used to support cable grids 1002 and 1004 in a V-shape. Setbacks 1018 are positioned using substantially same spacing used to position back straps 1014. Setbacks 1018 are anchored to cable grids 1002 and 1004 and lead ring 1012 using terminal couplers 1020, as shown in FIG. 11. FIG. 11 illustrates an exemplary layout representing half grid of marine species sorting apparatus 1000. Terminal couplers 1020 may be used to anchor back straps 104 or bars 108 to cable grids 1002 and 1004. Terminal couplers 1020 may also be used to anchor setbacks 1018 to lead ring 1012. In one embodiment of the present invention, terminal couplers 1020 having two open ends are used to anchor setbacks 1018a and 1018b to lead ring 1012, as shown in FIG. 10. Table 4 provides exemplary dimensions of back straps, bars, lead ring, bar spacings, and back strap spacings for the exemplary embodiment (Type III) shown in FIG. 11.

TABLE 4

Type III Cable Grid (FIGS. 10-11)

| Cable Type | Cable Length |
| --- | --- |
| Lead Ring Setbacks | 6' |
| 1 | 17" |
| 2 | 34" |
| 3 | 48" |
| Bars | |
| 0 | 72" |
| 1 | 73" |
| 2 | 75" |
| 3 | 77" |
| 4 | 78" |
| 5 | 77" |
| 6 | 75" |
| 7 | 73" |
| 8 | 72" |
| Bars | Bar Spacing |
| 0-1 | 6" |
| 1-2 | 6" |

TABLE 4-continued

Type III Cable Grid (FIGS. 10-11)

| Cable Type | Cable Length |
| --- | --- |
| 2-3 | 4" |
| 3-4 | 4" |
| 4-5 | 4" |
| 5-6 | 4" |
| 6-7 | 4" |
| 7-8 | 4" |
| Center Post | 36" |
| Backstraps | |
| 1 | 36" |
| 2 | 36" |
| 3 | 36" |

Figure 12:
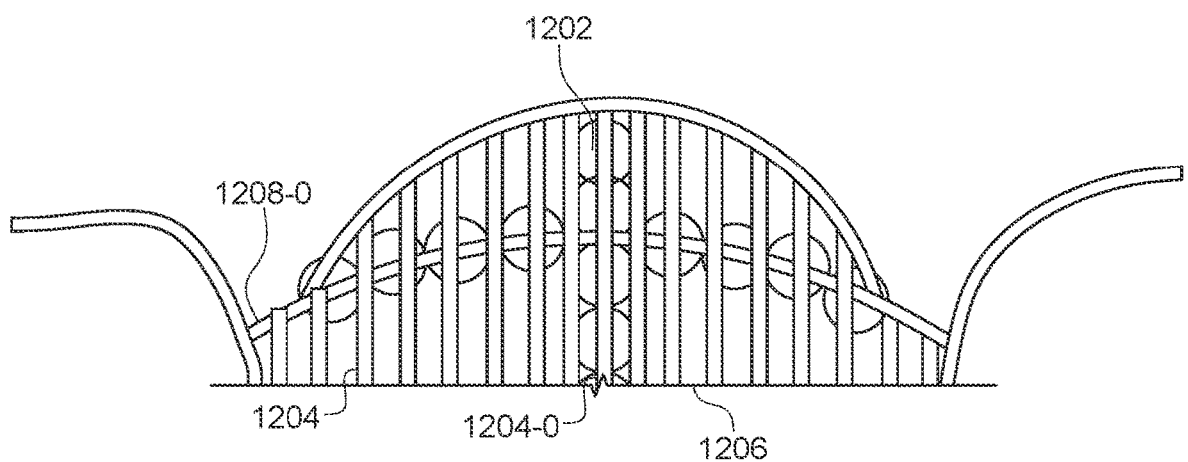
FIG. 12 illustrates an exemplary distribution of floats secured to marine species sorting apparatus in accordance with embodiments of the present invention.

In embodiments of the present invention, floats 1202 can be used to provide buoyancy to marine species sorting apparatus in accordance with embodiments of the present invention, as illustrated in FIG. 12 for Types I and II marine species sorting apparatus. In marine species sorting apparatus in accordance with embodiments of the present invention, from about 50% to about 75% of the weight of the cable used is complimented with buoyancy to help the apparatus achieve a neutral position in the profile of the trawl net. Floats 1202 are secured to bars 1204 and are positioned at predetermined locations on cable grid 1206 to provide buoyancy to cable grid 1206 and to prevent twisting of net during deployment and during operation of the trawl. In one embodiment of the present invention, floats 1202 are positioned in an area that represents the horizontal catenary of back straps 1208 and an area furthest away from any trawl webbing support, as shown in FIG. 12. In another embodiment of the present invention, floats 1202 are secured to bar 1204-0 from top of bar 1204-0 to at least midline of cable grid 1206 and to back strap 1208-0.

Marine species sorting apparatus 100 in accordance with embodiments of the present invention is installed into a tube of webbing called an extension having dimensions capable of fitting to the trawl. Cable grid 102 is sewn to extension webbing to secure cable grid 102 to the extension. Lead ring 106 is secured to the fishing circle along a straight row of meshes perpendicular to the direction the trawl is pulled when fishing. Lead ring 106 is positioned towards the front of the trawl and the opening for allowing undesired marine species to exit grid 102 is positioned towards the back or cod end of the trawl. Back straps 104 are secured to the top quarter of the extension. Location where the apex of back straps 104 are secured to extension will determine the angle of grid 102 and the shape of opening at the posterior end of grid 102. The area of the extension webbing within the apex of back strap 104, and ahead of grid 102, will define the escape opening. Opening in the webbing is cut at the end of grid 102 that is farthest from lead ring 106, or at the posterior end of grid 102, and back straps 104 are secured to the extension.

During typical operation of marine species sorting apparatus 100 installed within the trawl deployed for fishing, marine species entering the trawl are directed to marine species sorting apparatus 100 within the extension section of the trawl for sorting. Target marine species that are smaller than the bar spacing of bars 108 are directed through the bar spacing into the tail end of the trawl. The slope of grid 102 will direct marine species that are larger than the bar spacing of bars 108 through opening at the posterior end of grid 102 cut in the extension webbing of trawl.

Figure 13:
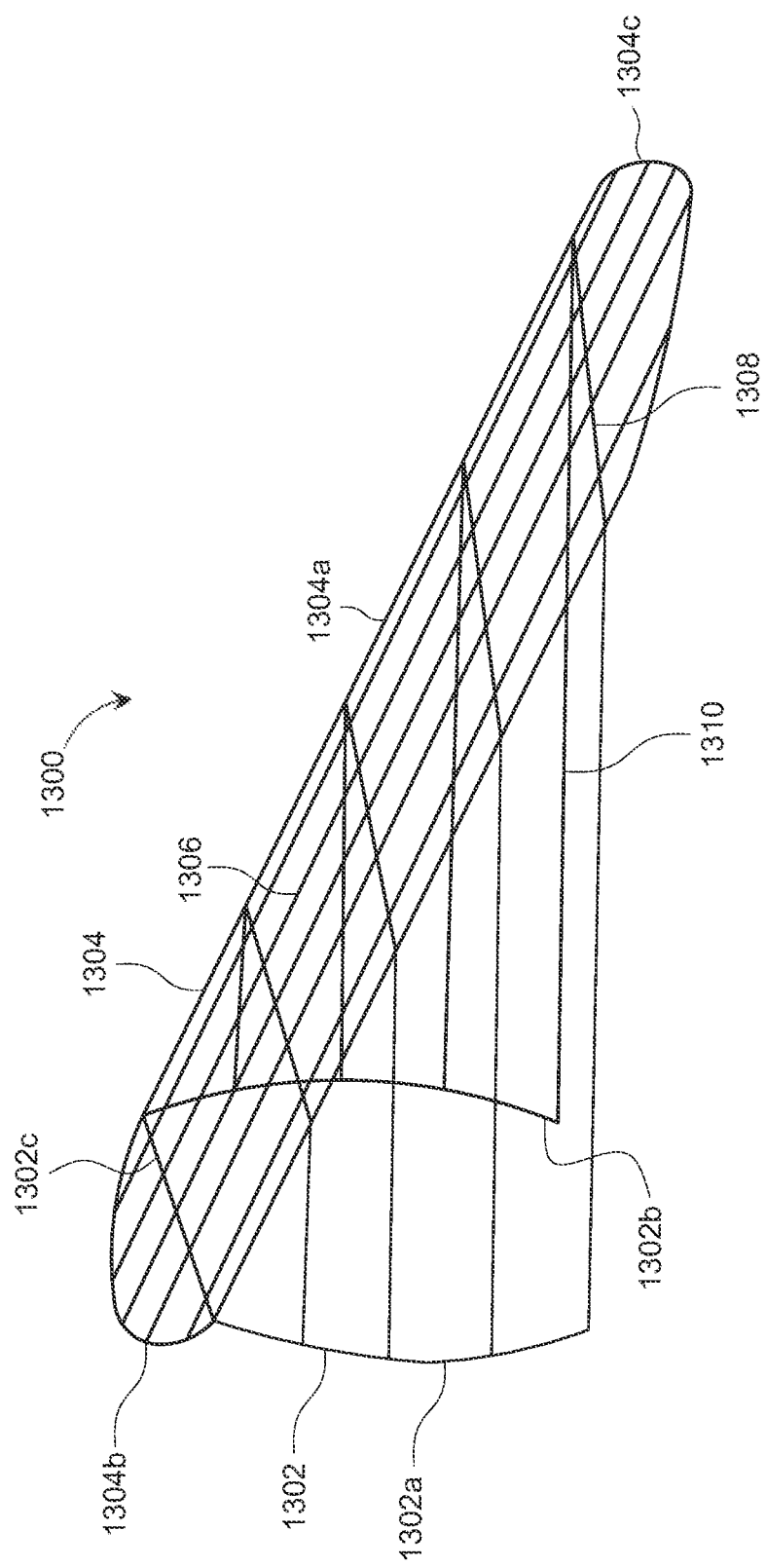
FIG. 13 illustrates an alternate embodiment of marine species sorting apparatus in accordance with an embodiment of the present invention.
Figure 14:
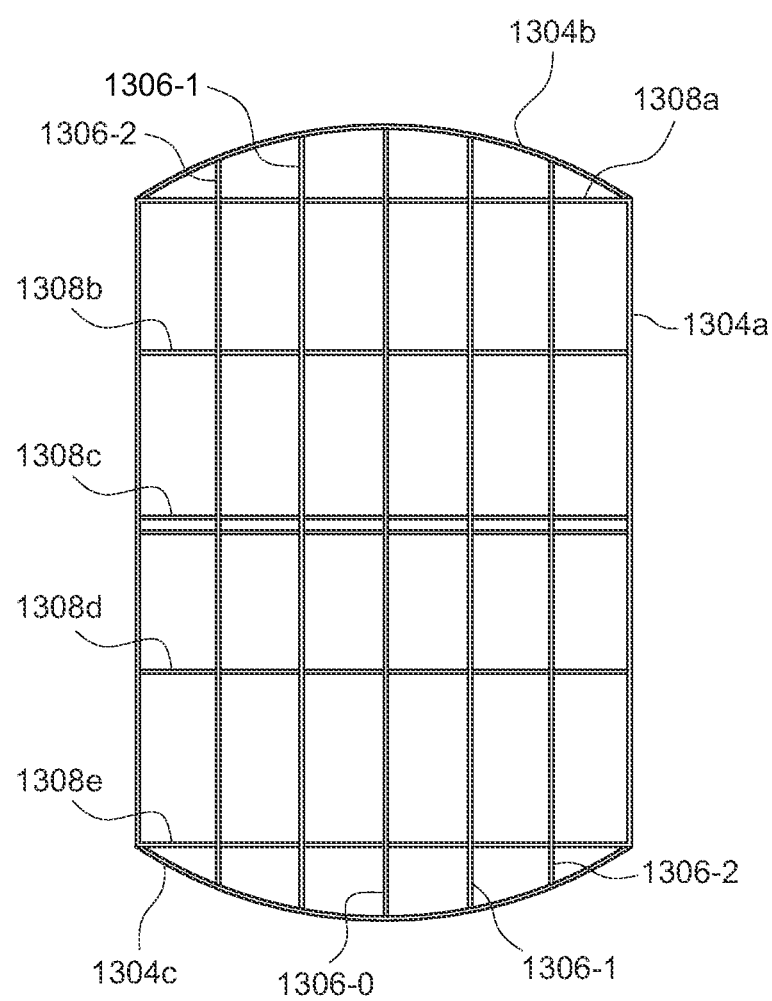
FIG. 14 illustrates an exemplary layout representing a grid frame of an alternate embodiment of the marine species sorting apparatus.

FIG. 13 illustrates a marine species sorting apparatus 1300 in accordance with an alternate embodiment of the present invention, including a lead ring 1302 secured to grid frame 1304. Grid frame 1304 includes a rectangular section 1304a with curved sections 1304b-c at the top and bottom of rectangular section 1304a, as shown in FIG. 14. In one embodiment of the present invention, the length of rectangular section 1304a is about 96 inches. Grid frame 1304 surrounds a grid including a plurality of bars 1306 and back straps 1308 arranged in a predetermined layout, as shown in FIGS. 13 and 14, with each bar having a predetermined length and separated from each other by a predetermined bar spacing. In one embodiment of the present invention, the spacing between bars 1306 is about 6 inches. In the embodiment as shown in FIGS. 13 and 14, bars 1306 are arranged in a symmetrical layout on either side of a center bar 1306-0 extending along a direction substantially traversing longitudinal axis of grid frame 1304. Bars 1306-1 are positioned next to bar 1306-0 and bars 1306-2 are positioned farthest away from bar 1306-0, as shown in FIG. 14. In the embodiment shown in FIGS. 13 and 14, bar 1306-0 is the longest bar and bars 1306-2 are the shortest bars. Each end of bars 1306 are secured to grid frame 1304. In some embodiments of the present invention, a plurality of floats are secured to bars 1306 at predetermined locations to provide buoyancy to apparatus 1300. Back straps 1308 are positioned perpendicular to bars 1306, and parallel to each other with a predetermined space between each other and with a degree of offset. Parallel back straps 1308 with consistent distance between them are obtained by securing back straps 1308 to bars 1306. Each end of back straps 1308 are secured to grid frame 1304. In the layout shown in FIGS. 13 and 14, back straps 1308 are equal length. In one embodiment of the present invention, the length of each back strap 1308 is about 40 inches. In an exemplary embodiment in accordance with the present invention, the distance between the back straps 1308 is about 24 inches. In some embodiments of the present invention, back strap 1308-2 located at the center of grid frame 1304 includes two cables combined to form a single back strap, as shown in FIG. 14.

Lead ring 1302 includes a first curved section 1302a, a second curved section 1302b and a straight section 1302c, as shown in FIG. 13. In one embodiment of the present invention, back strap 1308-0 forms the straight section 1302c of lead ring 1302. One end of first curved section 1302a and one end of second curved section 1302b are each secured to straight section 1302c and grid frame 1304. In one embodiment of the present invention, one end of curved section 1302a and curved section 1302b are each secured to straight section 1302c and grid frame 1304 using a four-way (4W) knuckle.

Figure 15:
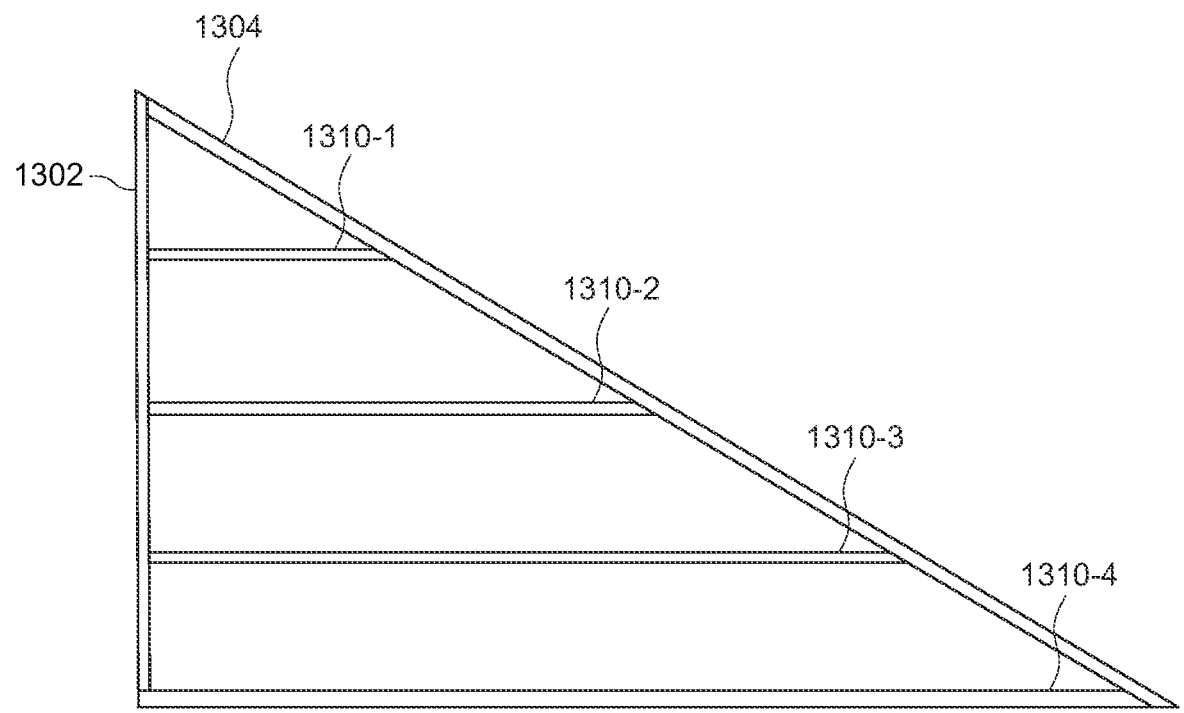
FIG. 15 illustrates an exemplary layout representing a side panel of a grid frame of an alternate embodiment of the present invention.

Setbacks 1310 between grid frame 1304 and lead ring 1302 form side panels that are used to support grid frame 1304 in a desired shape. FIG. 15 illustrates an exemplary layout representing a side panel formed by lead ring 1302, grid frame 1304 and setbacks 1310. In an embodiment of the present invention, setbacks 1310 are made of 6×19 stainless steel cables. Setbacks 1310 are positioned using substantially same spacing used to position back straps 1308. Setbacks 1310-1 through 1310-3 are anchored to grid frame 1304 and lead ring 1302 using terminal couplers. Setbacks 1310-4 are secured to the distal ends of curved sections 1302a and 1302b and to back strap 1308-4 and grid frame 1304, as shown in FIGS. 13 and 15. In one embodiment of the present invention, setbacks 1310-4 are secured to the distal ends of curved sections 1302a and 1302b and to back strap 1308-4 and grid frame 1304 using four-way (4W) knuckles. The shape of each side panel is set by varying the lengths of setbacks 1310. Lengths of setbacks 1310 decreases from setback 1310-1 to setback 1310-4 such that the plane of lead ring 1302 is set at a predetermined angle with the plane of grid frame 1304, as shown in FIGS. 13 and 15. In one embodiment of the present invention, the lengths of setbacks 1310 are set such that the angle between the plane of lead ring 1302 and the plane of grid frame 1304 is about 30 degrees. Table 5 provides exemplary dimensions of back straps, bars, lead ring, setbacks, bar spacings, and back strap spacings for an exemplary embodiment in accordance with the present invention, as shown in FIGS. 13, 14 and 15.

TABLE 5

| Suri TII 2.0 Grid | |
|---|---|
| Cable Type | Cable Length |
| Lead Ring | |
| 1302a | 48" |
| 1302b | 48" |
| Grid Frame | |
| 1304b | 48" |
| 1304c | 48" |
| Bars | |
| 1306-0 | 120" |
| 1306-1 | 116" |
| 1306-2 | 108" |
| Backstraps | |
| 1308-0 | 40" |
| 1308-1 | 40" |
| 1308-2 | 40" |
| 1308-3 | 40" |
| 1308-4 | 40" |
| Set Back | |
| 1310-1 | 20.75" |
| 1310-2 | 41.5" |
| 1310-3 | 62.28" |
| 1310-4 | 83.16" |

| Bars | Distance between Bars |
|---|---|
| 1306-0-1306-1 | 6" |
| 1306-1-1306-2 | 6" |
| 1306-2-1306-3 | 6" |

| Backstraps | Distance between backstraps at Bar 1306-0 |
|---|---|
| 1308-0-1308-1 | 24" |
| 1308-1-1308-2 | 24" |
| 1308-2-1308-3 | 24" |
| 1308-3-1308-4 | 24" |

Figure 16:
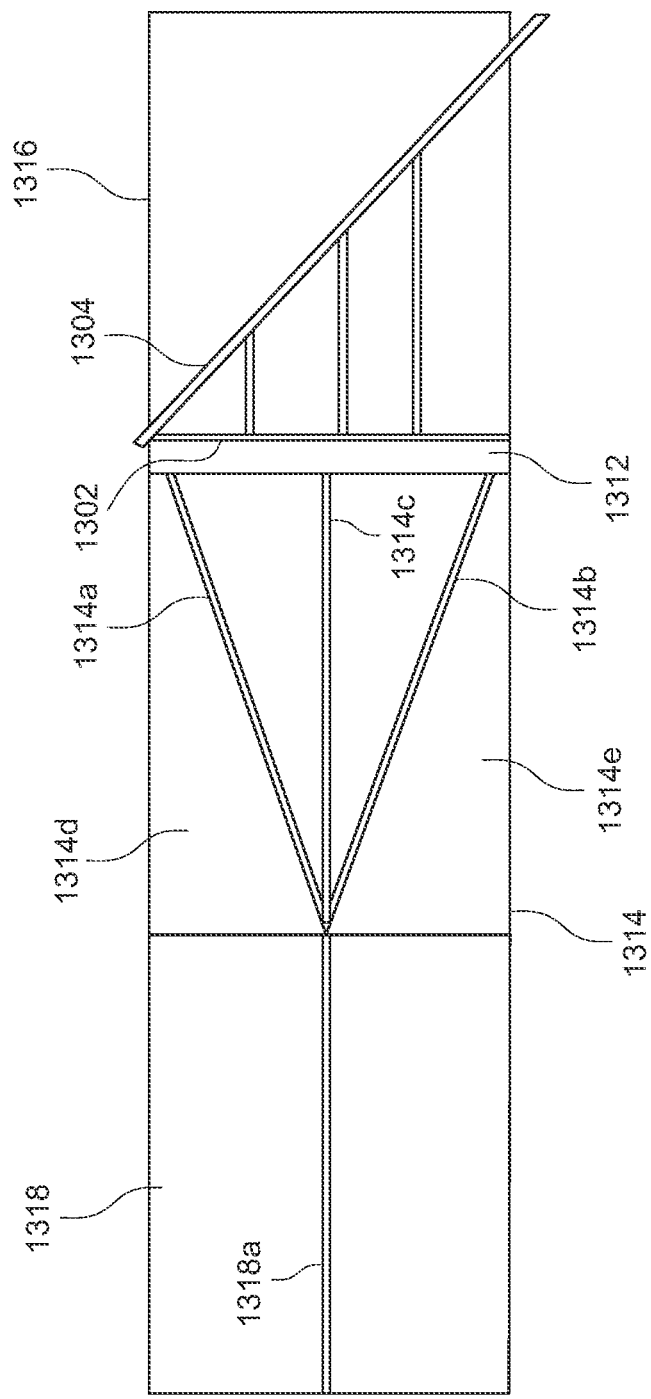
FIG. 16 illustrates an exemplary layout representing a grid frame extension of an alternate embodiment of the present invention.

Lead ring 1302 supports grid frame 1304 and secures marine species sorting apparatus 1300 in trawl webbing via a lead extension panel 1312 and a transition piece webbing 1314, as shown in FIG. 16. Lead ring 1302 and grid frame 1304 are located inside a grid frame extension webbing 1316. In an embodiment of the present invention, grid frame extension webbing 1316 is a high tenacity polyethylene (HTPE) fiber webbing having a mesh size of about 120 millimeters and an area of about 25×25 mesh. A mesh is typically comprised of four bars in the shape of a diamond and bars are typically about half the length of a stretched mesh. Exemplary webbing that can be used for grid frame extension webbing 1316 include 120 millimeter K/K 4 millimeter Euroline® webbing. Lead extension panel 1312 is formed by extending grid frame extension webbing 1316 beyond lead ring 1302. In one embodiment of the present invention, lead extension panel 1312 is formed by extending grid frame extension webbing 1316 beyond lead ring 1302 by about four mesh.

Figure 17:
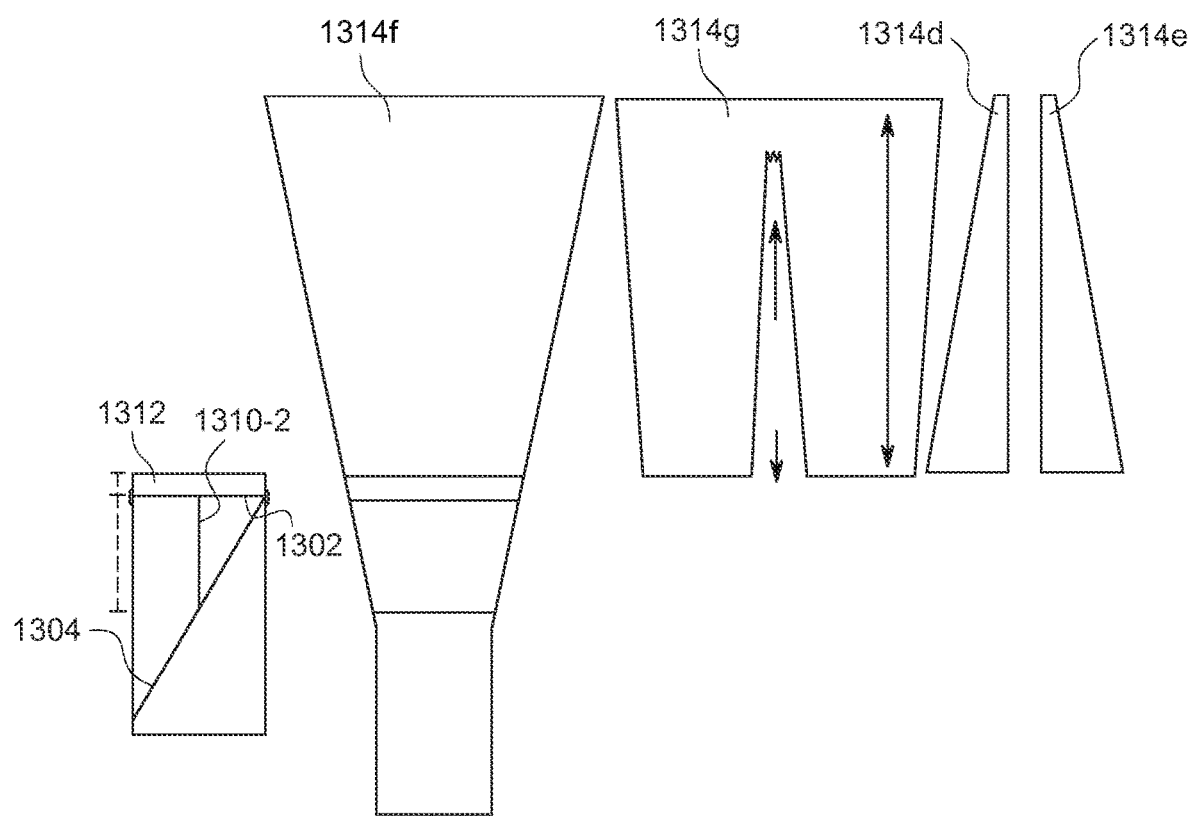
FIG. 17 illustrates an exemplary webbing panels for a transition piece webbing in an alternate embodiment of the present invention.

FIG. 17 illustrates exemplary webbing panels for grid frame extension webbing 1316 and transition piece webbing 1314. Transition piece webbing 1314 includes two top side panels 1314*d*, two bottom side panels 1314*e*, a bottom belly panel 1314*f* and top belly panel 1314*g*, as shown in FIG. 17. In one embodiment of the present invention, bottom belly panel 1314*f* is a 80 millimeter diameter webbing having a width of about 116 mesh at the leading edge and tapers to about 46 mesh as it enters grid frame 1304 such that the length of each side edge of bottom belly panel 1314*f* is about 82 bars. In an embodiment of the present invention, top belly panel 1314*g* has a width of about 120 mesh at the leading edge and tapers to about 50 mesh at the edge adjacent to lead extension panel 1312 such that the length of top belly panel 1314*g* is about 30 mesh with each side having a length of about 60 bars. Top belly panel 1314*g* edge adjacent to lead extension panel 1312 includes a wedge shaped gap having a ratio of wedge width to wedge height at about 1:2 such that the distance between the apex of the wedge and the leading edge of top belly panel 1314*g* is about 5 mesh. In an embodiment of the present invention, top side panel 1314*d* and bottom side panel 1314*e* each have a width of about 5 mesh at the leading edge and expands to about 22.5 mesh at the edge adjacent to lead extension panel 1312. In the exemplary configuration shown in FIG. 17, bottom belly panel 1314*f* can have about 40% more strain than the top belly panel 1314*g* allowing bottom belly panel 1314*f* to be tight, flat and level, and directing the water flow towards grid frame 1304. Top belly panel 1314*g* would be slack and ballooning in comparison allowing the excess water flow to pass through the open webbing meshes as the marine species are collected and directed through the bars.

Transition piece webbing 1314 panels are secured using eight gore lines that transition the shape of trawl from a two-seam trawl to four-seam trawl, as shown in FIG. 16. This can be achieved with six gore lines starting from the forward middle point of transition piece webbing 1314 with two top transition gore lines 1314*a*, one for each side of transition piece webbing 1314, secured to the top corners of lead ring 1302 on its respective sides, with two bottom transition gore lines 1314*b*, one for each side of transition piece webbing 1314, secured to the bottom corners of lead ring 1302 on its respective sides, and with two midline reduction gore lines 1314*c*, one for each side of transition piece webbing 1314, secured to lead ring 1302 and setback 1310-2 on its respective sides, as shown in FIG. 16. Transition piece webbing 1314 transitions the vertically compressed fishing circle of the two-seam trawl to a symmetrical fishing circle that better supports the round shape of lead ring 1302. Midline reduction gore line 1314*c* located between top side panel 1314*d* and bottom side panel 1314*e* on transition piece webbing 1314 and a midline reduction gore line 1318*a* located at the intersection of the top and bottom belly panels of the tail 1318 of the two-seam trawl reduce the mesh count of the fishing circle.

Figure 18:
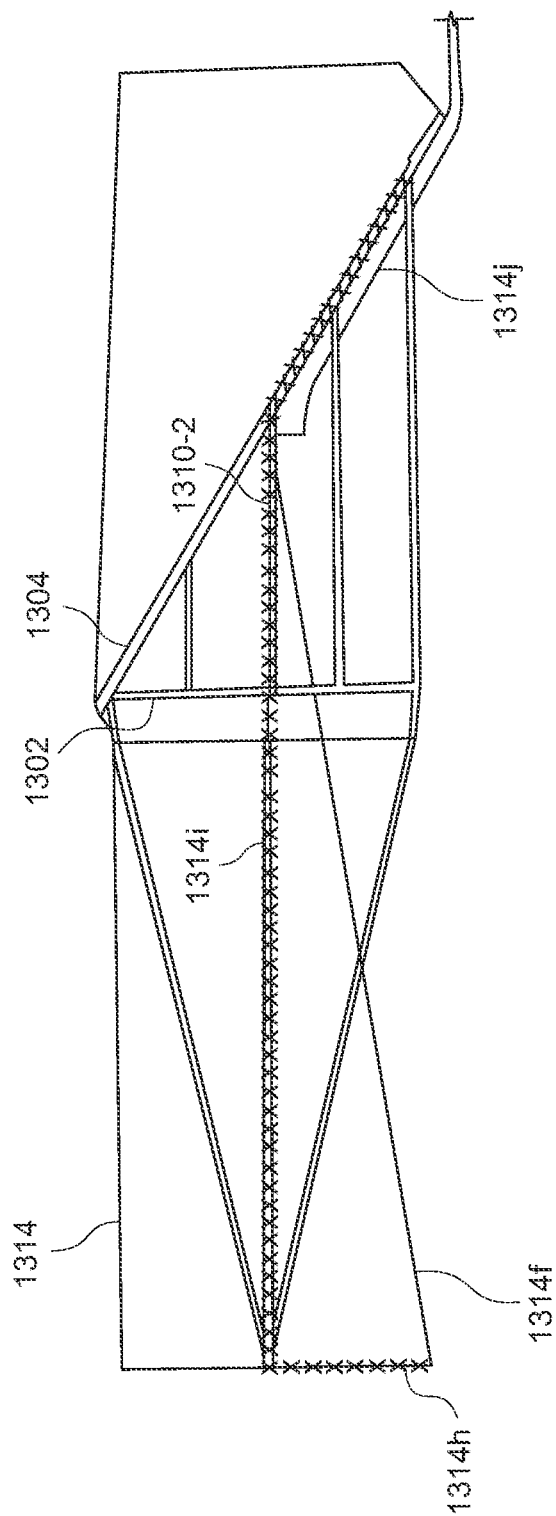
FIG. 18 illustrates an exemplary representing a bottom belly for an alternate embodiment of the marine species sorting apparatus.
Figure 19:
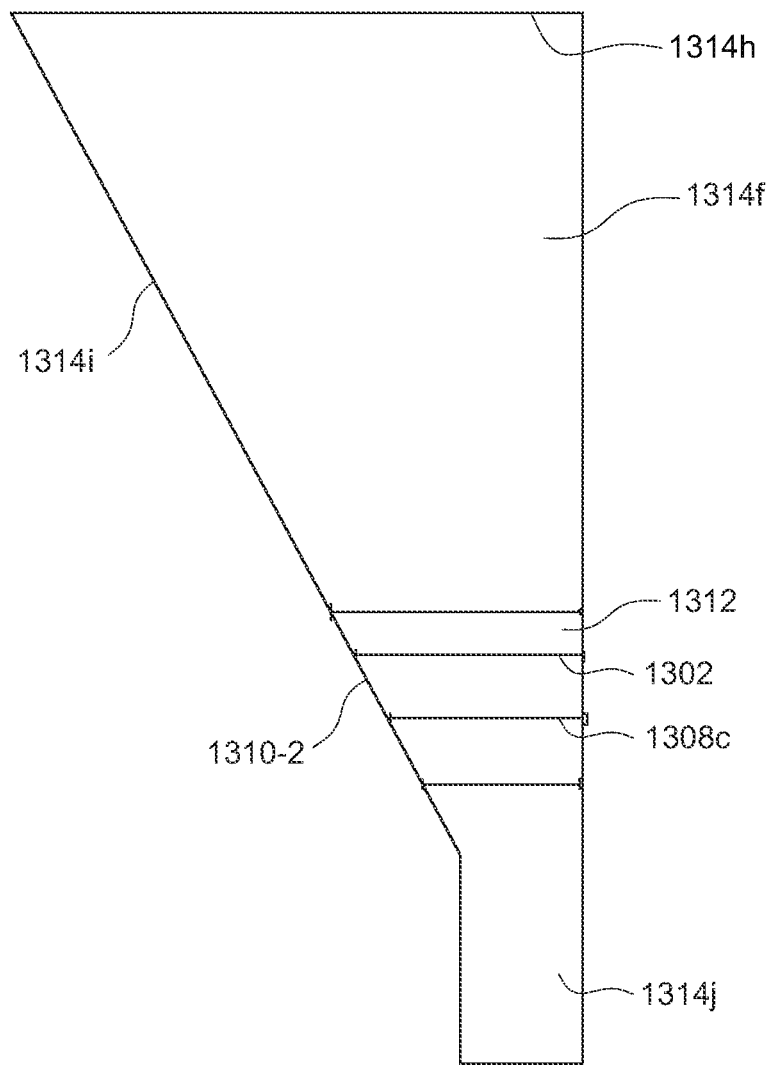
FIG. 19 illustrates an exemplary half webbing panel for a bottom belly in an alternate embodiment of the present invention.

Bottom belly 1314*f* of transition piece webbing 1314 forms a ramp, as shown in FIG. 18, that is capable of directing the catch and water towards the top half of grid frame 1304. Bottom belly 1314*f* includes two half webbing panels and each half webbing panel is secured along its leading edge 1314*h*, as shown with "x" in FIG. 18, with an offset seam to the bottom belly at the tail of a two-seam trawl. FIG. 19 illustrates an exemplary half webbing panel for bottom belly 1314*f*. Side edge 13141 of each panel of bottom belly 1314*f* includes bars extending from the leading edge of transition piece webbing 1314 to back strap 1308-2 along midline reduction gore line 1314*c*, and along a lead extension panel 1312 and setback 1310-2 of a side panel of grid frame 1304. Side edge 13141 of bottom belly 1314*f* is secured to between top side panel 1314*d*, bottom side panel 1314*e* and midline reduction gore line 1314*c* starting from leading edge of transition piece webbing 1314, to setback 1310-2, and to a portion of grid frame 1304 starting from setback 1310-2 to setback 1310-4 of a side panel of grid frame 1304, as further shown in FIG. 18. FIG. 19 further illustrates locations where an exemplary half webbing panel for bottom belly 1314*f* is secured to transition piece webbing 1314 panels, setback 1310-2 and grid frame 1304. In one embodiment of the present invention, side edge 13141 of each panel of bottom belly 1314*f* is about 82 bars with 54 bars secured to midline reduction gore line 1314*c*, 10 bars extending into lead extension panel 1312 and 18 bars secured to setback 1310-2.

Bottom belly 1314*f* extends inside the grid extension webbing to form a ramp when grid frame 1304 is held inline by the gores as the trawl is being towed and transitions into a flap 1314*j* as it reaches grid frame 1304. Flap 1314*j* is secured to grid frame 1304 until an opening at the posterior end of grid frame 1304. In one embodiment of the present invention, flap 1314*j* is sewn along grid frame 1304 until the opening at the posterior end of grid frame 1304 and further sewn to grid frame 1304 webbing by no more than 3 mesh beyond grid frame 1304. Flap 1314*j* extends for a predetermined length beyond the opening at the posterior end of grid frame 1304. In one embodiment of the present invention, flap 1314*j* extends for about 2 feet beyond the opening at the posterior end of grid frame 1304. In one embodiment of the present invention, bottom belly 1314*f* is about 116 inches wide along leading edge 1314*h* and about 43 inches wide at the tail of flap 1314*j*.

During typical operation of marine species sorting apparatus 1300 installed within the trawl deployed for fishing, marine species entering the trawl are directed towards the top half of grid frame 1304 while allowing the bottom half of grid frame 1304 to drop below the fishing circle. As the marine species passes through the top half of grid frame 1304 the bottom half of grid frame 1304 secures flap 1314*j* to maximize catch retention.

Apparatus in accordance with embodiments of the present invention has several advantages over previous marine species sorting apparatus. More particularly, marine species sorting apparatus in accordance with embodiments of the present invention has more flexibility than a rigid grid system, which forces a trawl to conform to the shape of the grid to work properly. More specifically, marine species sorting apparatus can conform to the dynamic properties of the trawl and the changing stresses the trawl endures. A rigid grid will break before it bends and cannot be easily packed into a net reel. The use of cables into a sorting grid system, as shown in embodiments of marine species sorting apparatus, provides flexibility and simplifies the process of packing marine species sorting apparatus onto a net reel. A significant advantage of marine species sorting apparatus in accordance with embodiments of the present invention is the ability of the grid to hold its shape while being dynamic, flexing and adjusting to the tension in the trawl webbing, and transform its shape with the shape of the trawl.

Marine species sorting apparatus in accordance with embodiments of the present invention can be adapted to a variety of configurations suitable for selective trawl fishing. Construction of grid, as described herein, provides flexibility to vary the shape of marine species sorting apparatus to fit specific trawl shapes. It is thought that marine species sorting apparatus of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. An apparatus for excluding undesired marine species from a trawl net during trawling, said apparatus comprising:
 a grid comprising an array of plurality of bars and a plurality of back straps, wherein each of the plurality of bars is secured to at least one of the plurality of back straps at a predetermined location, wherein the plurality of bars are arranged vertically in a symmetrical layout on either side of a center bar, wherein the plurality of bars are spaced apart by at least a first predetermined distance, wherein each of the plurality of back straps is positioned perpendicular to the plurality of bars, wherein the plurality of back straps are spaced apart by at least a second predetermined distance;
 a grid frame secured to the plurality of bars and the plurality of backstraps, wherein the grid frame surrounds the plurality of bars and the plurality of backstraps to form a rectangular section, a first curvature at anterior end of the rectangular section and a second curvature at posterior end of the rectangular section, wherein the plurality of bars are secured to the first and second curvatures formed by the grid frame;
 a lead ring formed by a first curved section, a second curved section and a straight section, wherein first end of the first curved section and first end of the second curved section are secured to the straight section and the grid frame;
 a plurality of setbacks positioned between the first curved section of the lead ring and the grid frame to form a first side panel and between the second curved section and the grid frame to form a second side panel, wherein the first and second side panels formed by the plurality of setbacks support the lead ring to funnel the marine species entering the trawl towards the plurality of bars; and
 a plurality of terminal couplers for securing the ends of each of the plurality of setbacks with the ends of the plurality of back straps and the grid frame,
 wherein said apparatus is adapted for insertion within the trawl body before cod end of the trawl net, wherein the lead ring is secured to fishing circle in the trawl net along a row of meshes perpendicular to the longitudinal axis of the trawl net, and wherein the undesired marine species exit the trawl net through the opening formed at the posterior end of the apparatus.

2. The apparatus of claim 1, wherein each of the plurality of bars is a 1×19 stainless steel cable, and wherein each of the plurality of back straps and the plurality of setbacks is a 6×19 stainless steel cable.

3. The apparatus of claim 1, wherein the spacing separating the plurality of bars is about 6 inches.

4. The apparatus of claim 1, wherein the at least one of the plurality of bars positioned proximal to the center bar is longer than the at least one of the plurality of bars positioned proximal to a side of the grid frame.

5. The apparatus of claim 1, wherein the center bar is secured to the grid frame at apex of the first and second curvatures formed by the grid frame.

6. The apparatus of claim 1, further comprising a plurality of floats secured to predetermined locations on the plurality of bars, wherein the plurality of floats provide buoyancy to the apparatus.

7. The apparatus of claim 1, wherein the length of the plurality of back straps is about 40 inches.

8. The apparatus of claim 1, wherein the distance separating the ends of plurality of back straps is about 24 inches.

9. The apparatus of claim 1, wherein the back strap positioned at a center of the grid frame comprises two cables combined to form a single back strap.

10. The apparatus of claim 1, wherein the first ends of the first and second curved sections of the lead ring are secured to the straight section of the lead ring and the grid frame using a four-way knuckle.

11. The apparatus of claim 1, wherein at least two of the plurality of setbacks positioned between a second end of the first curved section of the lead ring and the grid frame and between a second end of the second curved section of the lead ring and the grid frame are secured to the grid frame and at least one of the plurality of backstraps using a four-way knuckle.

12. The apparatus of claim 1, wherein the lengths of the plurality of setbacks positioned between the lead ring and the grid frame decrease from the distal end of the lead ring to the proximal end of the lead ring such that a plane of lead ring is set at a predetermined angle with a plane of the grid frame, and wherein the setbacks are spaced apart by at least the second predetermined distance.

13. The apparatus of claim 12, wherein the angle between the plane of the lead ring and the plane of the grid frame is about 30 degrees.

14. The apparatus of claim 1, wherein the lead ring and the grid frame are positioned inside a grid frame extension webbing.

15. The apparatus of claim 14, further comprising:
 a lead extension panel secured to the lead ring and the grid frame, wherein the lead extension panel extends the grid frame extension webbing outside the lead ring; and
 a transition piece webbing for transitioning a shape of the trawl net from a two-seam trawl net to a four-seam trawl net, wherein the transition piece webbing comprises two top side panels, two bottom panels, a bottom belly panel, and a top belly panel, wherein the side panels, the bottom panels, the bottom belly panel, and the top belly panel of the transition piece webbing are secured using eight gore lines.

16. The apparatus of claim 15, wherein the bottom belly directs the marine species towards the grid frame, and wherein the bottom belly extends inside the grid frame extension webbing to form a ramp and transitions into a flap.

17. An apparatus for excluding undesired marine species from a trawl net during trawling, said apparatus comprising:
 a grid comprising an array of plurality of bars and a plurality of back straps, wherein each of the plurality of bars is secured to at least one of the plurality of back straps at a predetermined location, wherein the plurality of bars are arranged vertically in a symmetrical layout on either side of a center bar, wherein the plurality of bars are spaced apart by at least one predetermined distance, wherein each of the plurality of bars has a predetermined length, wherein each of the plurality of back straps is positioned perpendicular to the plurality of bars;

a grid frame secured to distal ends of at least two of the plurality of bars positioned distally from the center bar, wherein the grid frame surrounds the plurality of bars to form an opening at posterior end of the apparatus, wherein the at least one of the plurality of back straps positioned distally from the grid frame is shorter than the at least one of the plurality of back straps positioned proximal to the grid frame, wherein the distance separating the ends of plurality of back straps is shorter than the distance separating the plurality of back straps proximal to the at least one of the plurality of bars positioned at the center of the grid frame;

a grid frame extension secured to the grid frame to extend the posterior end of the apparatus above the opening, wherein the grid frame extension forms a curvature to receive flap netting positioned to seal the opening, wherein distal ends of the plurality of bars positioned proximally at center of the apparatus is secured to the grid frame extension, wherein the center bar is secured to the grid frame extension at apex of the curvature formed by the grid frame extension;

a lead ring secured to ends of each of the plurality of back straps and proximal end of at least one of the plurality of bars, wherein the lead ring funnels the marine species entering the trawl towards the plurality of bars, wherein the lead ring offsets the plurality of back straps and hold the plurality of bars at a predetermined angle, wherein the lead ring is secured to fishing circle along a straight row of meshes perpendicular to a direction the trawl net is pulled;

a plurality of terminal couplers for securing the ends of each of the plurality of back straps and the proximal end of at least one of the plurality of bars to the lead ring, wherein the plurality of terminal couplers are oriented in a direction substantially facing the posterior end of the apparatus; and a plurality of floats secured to predetermined locations on the plurality of bars, wherein the plurality of floats provide buoyancy to the apparatus, wherein said apparatus is adapted for insertion within the trawl body before cod end of the trawl net, wherein the lead ring is secured to fishing circle in the trawl net along a row of meshes perpendicular to the longitudinal axis of the trawl net, wherein the back straps are secured to extension panel in the trawl net, and wherein the undesired marine species exit the trawl net through the opening formed at the posterior end of the apparatus.

18. The apparatus of claim 16, wherein each of the plurality of bars is a 1×19 stainless steel cable, and wherein each of the plurality of back straps is a 6×19 stainless steel cable.

19. The apparatus of claim 16, wherein bar spacing separating the plurality of bars positioned proximal to the center of the grid frame is narrower than the bar spacing separating the plurality of bars positioned distally from the center of the grid frame.

20. The apparatus of claim 16, wherein the lead ring is a round hoop.

\* \* \* \* \*